United States Patent
Park et al.

(10) Patent No.: US 10,778,017 B2
(45) Date of Patent: Sep. 15, 2020

(54) METHOD FOR PREVENTING ELECTRIC SHOCK AND ELECTRONIC DEVICE FOR THE SAME

(71) Applicant: Samsung Electronics Co., Ltd., Gyeonggi-do (KR)

(72) Inventors: Jung-Hoon Park, Incheon (KR); Jin-Hee Won, Gyeonggi-do (KR); Yongseung Yi, Gyeonggi-do (KR); Dong-Il Son, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 96 days.

(21) Appl. No.: 15/989,374

(22) Filed: May 25, 2018

(65) Prior Publication Data

US 2018/0351376 A1 Dec. 6, 2018

(30) Foreign Application Priority Data

May 30, 2017 (KR) .................. 10-2017-0066581

(51) Int. Cl.
*H02J 7/00* (2006.01)
*H02H 3/04* (2006.01)
*H02H 5/12* (2006.01)
*H02J 7/04* (2006.01)
*H02H 7/18* (2006.01)

(52) U.S. Cl.
CPC ........... *H02J 7/0029* (2013.01); *H02H 3/044* (2013.01); *H02H 5/12* (2013.01); *H02H 7/18* (2013.01); *H02J 7/00045* (2020.01); *H02J 7/0047* (2013.01); *H02J 7/04* (2013.01)

(58) Field of Classification Search
None
See application file for complete search history.

(56) References Cited

U.S. PATENT DOCUMENTS

| 8,213,183 | B2 | 7/2012 | Juan et al. | |
| 2006/0268489 | A1 | 11/2006 | Sung | |
| 2007/0097585 | A1 | 5/2007 | Sung | |
| 2008/0297116 | A1* | 12/2008 | Odaohhara | H01M 2/34 320/137 |

(Continued)

FOREIGN PATENT DOCUMENTS

| KR | 10-0665825 B1 | 1/2007 |
| KR | 10-2007-0058790 A | 6/2007 |

(Continued)

*Primary Examiner* — David V Henze-Gongola
(74) *Attorney, Agent, or Firm* — Cha & Reiter, LLC

(57) ABSTRACT

Various embodiments of the present disclosure provide an electronic device of a metal member and a method therefor. The electronic device includes: a memory; an abnormality detection circuit; and a processor functionally connected with the memory or the abnormality detection circuit, wherein the processor is configured to detect whether there is an abnormality in an electric shock prevention circuit or whether a leakage path is formed from a ground of the electronic device to the metal member by using the abnormality detection circuit, and to control charging a battery of the electronic device according to whether there is the abnormality in the electric shock prevention circuit or whether the leakage path is formed. Other embodiments are possible.

20 Claims, 15 Drawing Sheets

(56) References Cited

U.S. PATENT DOCUMENTS

| | | | | |
|---|---|---|---|---|
| 2013/0295419 A1* | 11/2013 | Kwon | ................... | G01R 31/36 |
| | | | | 429/10 |
| 2016/0018856 A1 | 1/2016 | Heo et al. | | |
| 2016/0049720 A1 | 2/2016 | Hwang et al. | | |
| 2016/0149417 A1* | 5/2016 | Davis | ................... | H02J 7/0021 |
| | | | | 320/162 |
| 2016/0301237 A1* | 10/2016 | Chen | ....................... | H01F 38/14 |
| 2016/0336761 A1* | 11/2016 | Hsu | ...................... | H02J 7/0029 |
| 2017/0108910 A1* | 4/2017 | Goh | ........................ | G06F 1/266 |
| 2018/0124904 A1* | 5/2018 | Cho | ....................... | H01G 4/002 |

FOREIGN PATENT DOCUMENTS

| | | |
|---|---|---|
| KR | 10-1051526 B1 | 7/2011 |
| KR | 10-1410900 B1 | 6/2014 |
| KR | 10-1578544 B1 | 12/2015 |
| KR | 10-2016-0009910 A | 1/2016 |
| KR | 10-2017-0006963 A | 1/2017 |

\* cited by examiner

METHOD FOR PREVENTING ELECTRIC SHOCK AND ELECTRONIC DEVICE FOR THE SAME

CROSS-REFERENCE TO RELATED APPLICATION(S)

This application is based on and claims priority under 35 U.S.C. § 119 to Korean Patent Application No. 10-2017-0066581, filed on May 30, 2017, in the Korean Intellectual Property Office, the disclosure of which is incorporated by reference herein in its entirety.

BACKGROUND

1. Field

The present disclosure relates to a method and an apparatus for preventing an electric shock.

2. Description of Related Art

With the recent development of digital technology, various types of electronic devices such as mobile communication terminals, personal digital assistants (PDAs), electronic schedulers, smart phones, tablet personal computers (PCs), wearable devices, or the like are widely used. To support and enhance functions of such electronic devices, hardware portions and/or software portions of electronic devices are continuously developing.

For example, as antennas of electronic devices gradually become miniaturized, they are developing from external antennas into embedded antennas. In particular, since performance of a small antenna depends on a shape and a material of an electronic device in which the antenna is mounted, unlike the other core components, the antenna has a problem that it should have a different design according to a terminal model to achieve the best performance. A recent electronic device may have an exterior surrounding a housing thereof and formed of metal, and may use a portion of the metal as an antenna.

The above information is presented as background information only to assist with an understanding of the present disclosure. No determination has been made, and no assertion is made, as to whether any of the above might be applicable as prior art with regard to the present disclosure.

SUMMARY

According to various embodiments, an electronic device which is formed of a metal member includes: a memory; an abnormality detection circuit; and a processor functionally connected with the memory or the abnormality detection circuit, wherein the processor is configured to detect whether there is an abnormality in an electric shock prevention circuit or whether a leakage path is formed from a ground of the electronic device to the metal member by using the abnormality detection circuit, and to control charging a battery of the electronic device according to whether there is the abnormality in the electric shock prevention circuit or whether the leakage path is formed.

According to various embodiments, a method for operating of an electronic device which is formed of a metal member includes: detecting whether there is an abnormality in an electric shock prevention circuit mounted in the electronic device or whether a leakage path is formed from a ground of the electronic device to the metal member using an abnormality detection circuit; and controlling charging a battery of the electronic device according to whether there is the abnormality in the electric shock prevention circuit or whether the leakage path is formed.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
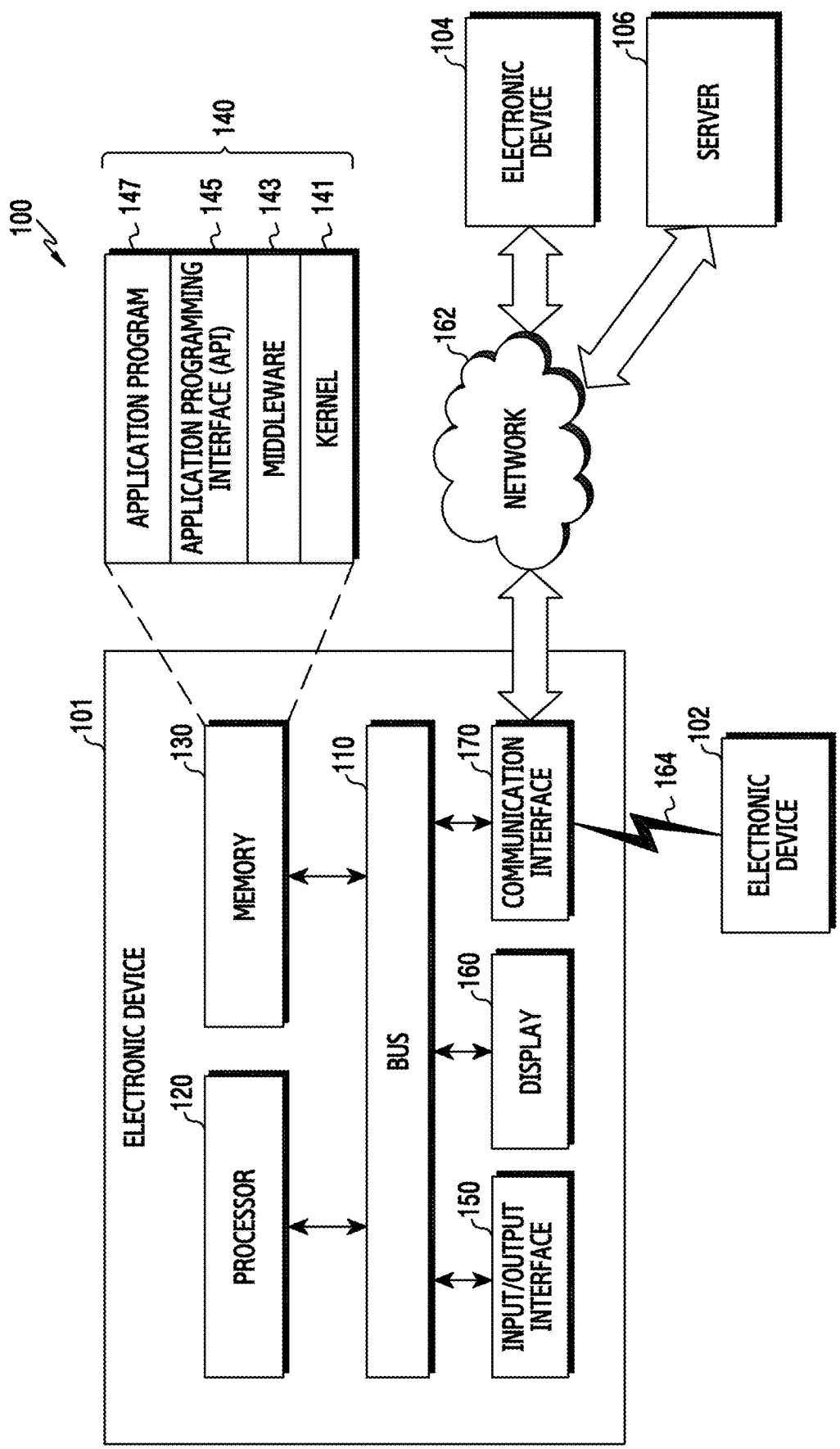
FIG. 1 is a view showing an electronic device in a network environment according to various embodiments.

Hereinafter, various embodiments of the present disclosure will be described with reference to the accompanying drawings. However, it should be understood that there is no intent to limit the present disclosure to the particular forms disclosed herein; rather, the present disclosure should be construed to cover various modifications, equivalents, and/or alternatives of embodiments of the present disclosure. In describing the drawings, similar reference numerals may be used to designate similar constituent elements.

As used herein, the expression "have", "may have", "include", or "may include" refers to the existence of a corresponding feature (e.g., numeral, function, operation, or constituent element such as component), and does not exclude one or more additional features.

In the present disclosure, the expression "A or B", "at least one of A or/and B", or "one or more of A or/and B" may include all possible combinations of the items listed. For example, the expression "A or B", "at least one of A and B", or "at least one of A or B" refers to all of (1) including at least one A, (2) including at least one B, or (3) including all of at least one A and at least one B.

The expression "a first", "a second", "the first", or "the second" used in various embodiments of the present disclosure may modify various components regardless of the order and/or the importance but does not limit the corresponding components. For example, a first user device and a second user device indicate different user devices although both of them are user devices. For example, a first element may be termed a second element, and similarly, a second element may be termed a first element without departing from the scope of the present disclosure.

It should be understood that when an element (e.g., first element) is referred to as being (operatively or communicatively) "connected," or "coupled," to another element (e.g., second element), it may be directly connected or coupled directly to the other element or any other element (e.g., third element) may be interposer between them. In contrast, it may be understood that when an element (e.g., first element) is referred to as being "directly connected," or "directly coupled" to another element (second element), there are no element (e.g., third element) interposed between them.

The expression "configured to" used in the present disclosure may be exchanged with, for example, "suitable for", "having the capacity to", "designed to", "adapted to", "made to", or "capable of" according to the situation. The term "configured to" may not necessarily imply "specifically designed to" in hardware. Alternatively, in some situations, the expression "device configured to" may mean that the device, together with other devices or components, "is able to". For example, the phrase "processor adapted (or configured) to perform A, B, and C" may mean a dedicated processor (e.g. embedded processor) for performing the corresponding operations or a generic-purpose processor (e.g., central processing unit (CPU) or application processor (AP)) that can perform the corresponding operations by executing one or more software programs stored in a memory device.

The terms used in the present disclosure are only used to describe specific embodiments, and are not intended to limit the present disclosure. As used herein, singular forms may include plural forms as well unless the context clearly indicates otherwise. Unless defined otherwise, all terms used herein, including technical and scientific terms, have the same meaning as those commonly understood by a person skilled in the art to which the present disclosure pertains. Such terms as those defined in a generally used dictionary may be interpreted to have the meanings equal to the contextual meanings in the relevant field of art, and are not to be interpreted to have ideal or excessively formal meanings unless clearly defined in the present disclosure. In some cases, even the term defined in the present disclosure should not be interpreted to exclude embodiments of the present disclosure.

An electronic device according to various embodiments of the present disclosure may include at least one of, for example, a smart phone, a tablet Personal Computer (PC), a mobile phone, a video phone, an electronic book reader (e-book reader), a desktop PC, a laptop PC, a netbook computer, a workstation, a server, a Personal Digital Assistant (PDA), a Portable Multimedia Player (PMP), a MPEG-1 audio layer-3 (MP3) player, a mobile medical device, a camera, and a wearable device. According to various embodiments, the wearable device may include at least one of an accessory type (e.g., a watch, a ring, a bracelet, an anklet, a necklace, a glasses, a contact lens, or a Head-Mounted Device (HMD)), a fabric or clothing integrated type (e.g., an electronic clothing), a body-mounted type (e.g., a skin pad, or tattoo), and a bio-implantable type (e.g., an implantable circuit).

According to some embodiments, the electronic device may be a home appliance. The home appliance may include at least one of, for example, a television, a Digital Video Disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync®, Apple TV®, or Google TV®), a game console (e.g., Xbox® and PlayStation®), an electronic dictionary, an electronic key, a camcorder, and an electronic photo frame.

According to another embodiment, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Devices, an electronic devices for a ship (e.g., a navigation device for a ship, and a gyro-compass), avionics, security devices, an automotive head unit, a robot for home or industry, an automatic teller's machine (ATM) in banks, point of sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.).

According to some embodiments, the electronic device may include at least one of a part of furniture or a building/structure, an electronic board, an electronic signature receiving device, a projector, and various kinds of measuring instruments (e.g., a water meter, an electric meter, a gas meter, and a radio wave meter). The electronic device according to various embodiments of the present disclosure may be a combination of one or more of the aforementioned various devices. The electronic device according to some embodiments of the present disclosure may be a flexible device. Further, the electronic device according to an embodiment of the present disclosure is not limited to the aforementioned devices, and may include a new electronic device according to the development of technology.

Hereinafter, an electronic device according to various embodiments will be described with reference to the accompanying drawings. As used herein, the term "user" may indicate a person who uses an electronic device or a device (e.g., an artificial intelligence electronic device) that uses an electronic device.

FIG. 1 illustrates a network environment including an electronic device according to various embodiments of the present disclosure.

An electronic device 101 within a network environment, according to various embodiments, will be described with reference to FIG. 1. The electronic device 101 may include a bus 110, a processor 120, a memory 130, an input/output interface 150, a display 160, and a communication interface 170. According to an embodiment of the present disclosure, the electronic device 101 may omit at least one of the above components or may further include other components.

The bus 110 may include, for example, a circuit which interconnects the components 110 to 170 and delivers a communication (e.g., a control message and/or data) between the components 110 to 170.

The processor 120 may include one or more of a Central Processing Unit (CPU), an Application Processor (AP), and a Communication Processor (CP). The processor 120 may carry out, for example, calculation or data processing relating to control and/or communication of at least one other component of the electronic device 101.

The memory 130 may include a volatile memory and/or a non-volatile memory. The memory 130 may store, for example, commands or data relevant to at least one other component of the electronic device 101. According to an embodiment of the present disclosure, the memory 130 may store software and/or a program 140. The program 140 may include, for example, a kernel 141, middleware 143, an Application Programming Interface (API) 145, and/or application programs (or "applications") 147. At least some of the kernel 141, the middleware 143, and the API 145 may be referred to as an Operating System (OS).

The kernel 141 may control or manage system resources (e.g., the bus 110, the processor 120, or the memory 130) used for performing an operation or function implemented in the other programs (e.g., the middleware 143, the API 145, or the application programs 147). Furthermore, the kernel 141 may provide an interface through which the middleware 143, the API 145, or the application programs 147 may access the individual components of the electronic device 101 to control or manage the system resources.

The middleware 143, for example, may serve as an intermediary for allowing the API 145 or the application programs 147 to communicate with the kernel 141 to exchange data.

Also, the middleware 143 may process one or more task requests received from the application programs 147 according to priorities thereof. For example, the middleware 143 may assign priorities for using the system resources (e.g., the bus 110, the processor 120, the memory 130, or the like) of the electronic device 101, to at least one of the application programs 147. For example, the middleware 143 may perform scheduling or loading balancing on the one or more task requests by processing the one or more task requests according to the priorities assigned thereto.

The API 145 is an interface through which the applications 147 control functions provided from the kernel 141 or the middleware 143, and may include, for example, at least one interface or function (e.g., instruction) for file control, window control, image processing, character control, and the like.

The input/output interface 150, for example, may function as an interface that may transfer commands or data input from a user or another external device to the other element(s) of the electronic device 101. Furthermore, the input/output interface 150 may output the commands or data received from the other element(s) of the electronic device 101 to the user or another external device.

Examples of the display 160 may include a Liquid Crystal Display (LCD), a Light-Emitting Diode (LED) display, an Organic Light-Emitting Diode (OLED) display, a Micro-ElectroMechanical Systems (MEMS) display, and an electronic paper display. The display 160 may display, for example, various types of contents (e.g., text, images, videos, icons, or symbols) to users. The display 160 may include a touch screen, and may receive, for example, a touch, gesture, proximity, or hovering input using an electronic pen or a user's body part.

The communication interface 170 may establish communication, for example, between the electronic device 101 and an external device (e.g., a first external electronic device 102, a second external electronic device 104, or a server 106). For example, the communication interface 170 may be connected to a network 162 through wireless or wired communication, and may communicate with an external device (e.g., the second external electronic device 104 or the server 106). The wireless communication may use at least one of, for example, Long Term Evolution (LTE), LTE-Advance (LTE-A), Code Division Multiple Access (CDMA), Wideband CDMA (WCDMA), Universal Mobile Telecommunications System (UMTS), Wireless Broadband (WiBro), and Global System for Mobile Communications (GSM), as a cellular communication protocol. In addition, the wireless communication may include, for example, short range communication 164. The short-range communication 164 may include at least one of, for example, Wi-Fi, Bluetooth, Near Field Communication (NFC), and Global Navigation Satellite System (GNSS). GNSS may include, for example, at least one of global positioning system (GPS), global navigation satellite system (Glonass), Beidou Navigation satellite system (Beidou) or Galileo, and the European global satellite-based navigation system, based on a location, a bandwidth, or the like. Hereinafter, in the present disclosure, the "GPS" may be interchangeably used with the "GNSS". The wired communication may include, for example, at least one of a Universal Serial Bus (USB), a High Definition Multimedia Interface (HDMI), Recommended Standard 232 (RS-232), and a Plain Old Telephone Service (POTS). The network 162 may include at least one of a telecommunication network such as a computer network (e.g., a LAN or a WAN), the Internet, and a telephone network.

Each of the first and second external electronic devices 102 and 104 may be of a type identical to or different from that of the electronic device 101. According to an embodiment of the present disclosure, the server 106 may include a group of one or more servers. According to various embodiments of the present disclosure, all or some of the operations performed in the electronic device 101 may be executed in another electronic device or a plurality of electronic devices (e.g., the electronic devices 102 and 104 or the server 106). According to an embodiment of the present disclosure, when the electronic device 101 has to perform some functions or services automatically or in response to a request, the electronic device 101 may request another device (e.g., the electronic device 102 or 104 or the server 106) to execute at least some functions relating thereto instead of or in addition to autonomously performing the functions or services. Another electronic device (e.g., the electronic device 102 or 104, or the server 106) may execute the requested functions or the additional functions, and may deliver a result of the execution to the electronic device 101. The electronic device 101 may process the received result as it is or additionally, and may provide the requested functions or services. To this end, for example, cloud computing, distributed computing, or client-server computing technologies may be used.

Figure 2:
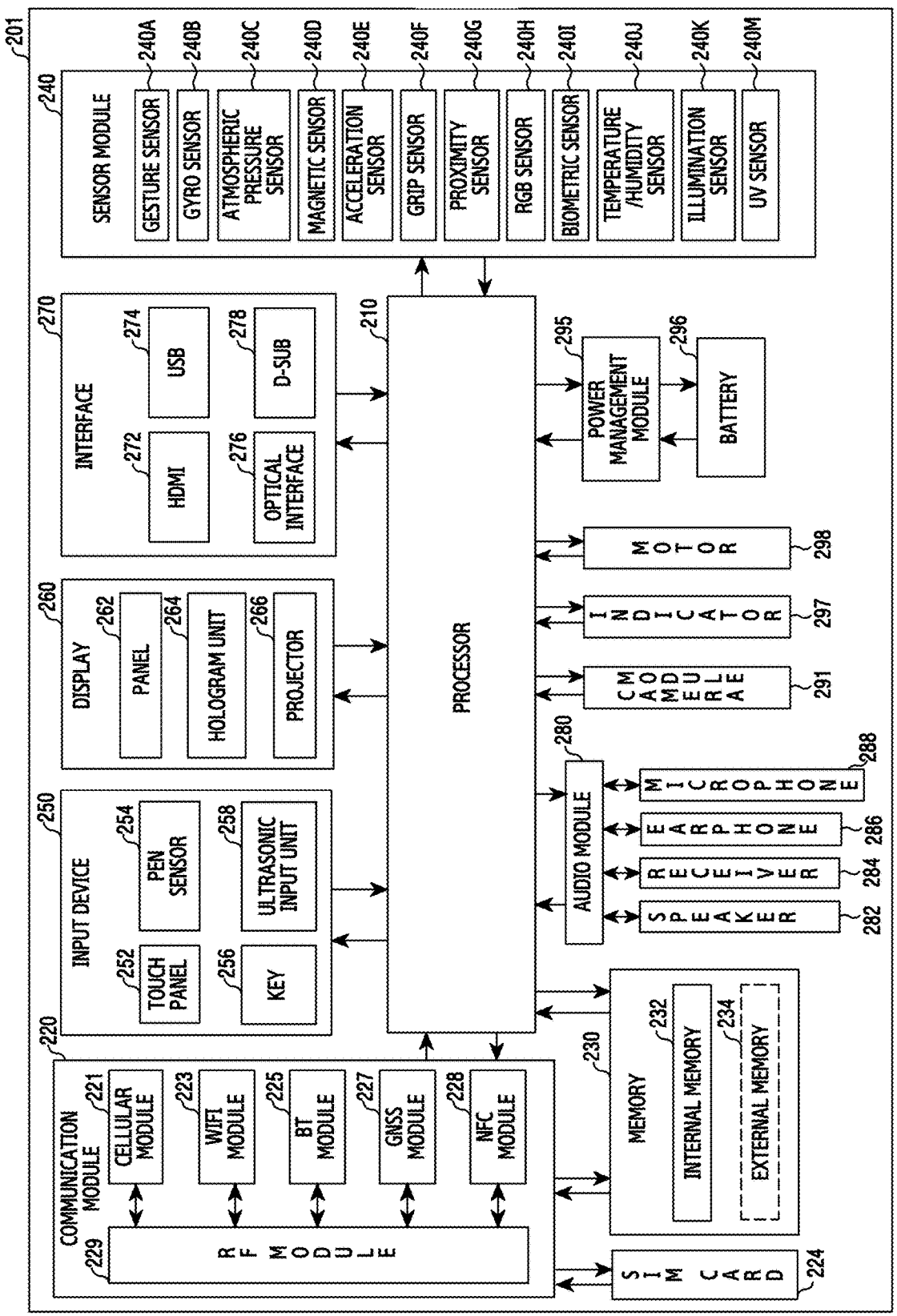
FIG. 2 is a block diagram showing a configuration of an electronic device according to various embodiments.

FIG. 2 is a block diagram of an electronic device according to various embodiments of the present disclosure.

The electronic device 201 may include, for example, all or a part of the electronic device 101 shown in FIG. 1. The electronic device 201 may include one or more processors 210 (e.g., Application Processors (AP)), a communication module 220, a Subscriber Identification Module (SIM) 224, a memory 230, a sensor module 240, an input device 250, a display 260, an interface 270, an audio module 280, a camera module 291, a power management module 295, a battery 296, an indicator 297, and a motor 298.

The processor 210 may control a plurality of hardware or software components connected to the processor 210 by driving an operating system or an application program, and perform processing of various pieces of data and calculations. The processor 210 may be embodied as, for example, a System on Chip (SoC). According to an embodiment of the present disclosure, the processor 210 may further include a Graphic Processing Unit (GPU) and/or an image signal processor. The processor 210 may include at least some (for example, a cellular module 221) of the components illustrated in FIG. 2. The processor 210 may load, into a volatile memory, commands or data received from at least one (e.g., a non-volatile memory) of the other components and may process the loaded commands or data, and may store various data in a non-volatile memory.

The communication module 220 may have a configuration equal or similar to that of the communication interface 170 of FIG. 1. The communication module 220 may include, for example, a cellular module 221, a Wi-Fi module 223, a BT module 225, a GNSS module 227 (e.g., a GPS module 227, a Glonass module, a Beidou module, or a Galileo module), an NFC module 228, and a Radio Frequency (RF) module 229.

The cellular module 221, for example, may provide a voice call, a video call, a text message service, or an Internet service through a communication network. According to an embodiment of the present disclosure, the cellular module 221 may distinguish and authenticate the electronic device 201 in a communication network using the subscriber identification module 224 (for example, the SIM card). According to an embodiment of the present disclosure, the cellular module 221 may perform at least some of the functions that the AP 210 may provide. According to an embodiment of the present disclosure, the cellular module 221 may include a communication processor (CP).

For example, each of the Wi-Fi module 223, the BT module 225, the GNSS module 227, and the NFC module 228 may include a processor for processing data transmitted/received through a corresponding module. According to an embodiment of the present disclosure, at least some (e.g., two or more) of the cellular module 221, the Wi-Fi module 223, the BT module 225, the GNSS module 227, and the NFC module 228 may be included in one Integrated Chip (IC) or IC package.

The RF module 229, for example, may transmit/receive a communication signal (e.g., an RF signal). The RF module 229 may include, for example, a transceiver, a Power Amplifier Module (PAM), a frequency filter, a Low Noise Amplifier (LNA), and an antenna. According to another embodiment of the present disclosure, at least one of the cellular module 221, the WIFI module 223, the BT module 225, the GNSS module 227, and the NFC module 228 may transmit/receive an RF signal through a separate RF module.

The subscriber identification module 224 may include, for example, a card including a subscriber identity module and/or an embedded SIM, and may contain unique identification information (e.g., an Integrated Circuit Card Identifier (ICCID)) or subscriber information (e.g., an International Mobile Subscriber Identity (IMSI)).

The memory 230 (e.g., the memory 130) may include, for example, an embedded memory 232 or an external memory 234. The embedded memory 232 may include at least one of a volatile memory (e.g., a Dynamic Random Access Memory (DRAM), a Static RAM (SRAM), a Synchronous Dynamic RAM (SDRAM), and the like) and a non-volatile memory (e.g., a One Time Programmable Read Only Memory (OTPROM), a Programmable ROM (PROM), an Erasable and Programmable ROM (EPROM), an Electrically Erasable and Programmable ROM (EEPROM), a mask ROM, a flash ROM, a flash memory (e.g., a NAND flash memory or a NOR flash memory), a hard disc drive, a Solid State Drive (SSD), and the like).

The external memory 234 may further include a flash drive, for example, a Compact Flash (CF), a Secure Digital (SD), a Micro Secure Digital (Micro-SD), a Mini Secure Digital (Mini-SD), an eXtreme Digital (xD), a MultiMediaCard (MMC), a memory stick, or the like. The external memory 234 may be functionally and/or physically connected to the electronic device 201 through various interfaces.

The sensor module 240, for example, may measure a physical quantity or detect an operation state of the electronic device 201, and may convert the measured or detected information into an electrical signal. The sensor module 240 may include, for example, at least one of a gesture sensor 240A, a gyro sensor 240B, an atmospheric pressure sensor (barometer) 240C, a magnetic sensor 240D, an acceleration sensor 240E, a grip sensor 240F, a proximity sensor 240G, a color sensor 240H (e.g., red, green, and blue (RGB) sensor), a biometric sensor (medical sensor) 240I, a temperature/humidity sensor 240J, an illuminance sensor 240K, and a Ultra Violet (UV) sensor 240M. Additionally or alternatively, the sensor module 240 may include, for example, an E-nose sensor, an electromyography (EMG) sensor, an electroencephalogram (EEG) sensor, an electrocardiogram (ECG) sensor, an Infrared (IR) sensor, an iris scan sensor, and/or a finger scan sensor. The sensor module 240 may further include a control circuit for controlling one or more sensors included therein. According to an embodiment of the present disclosure, the electronic device 201 may further include a processor configured to control the sensor module 240, as a part of the processor 210 or separately from the processor 210, and may control the sensor module 240 while the processor 210 is in a sleep state.

The input device 250 may include, for example, a touch panel 252, a (digital) pen sensor 254, a key 256, or an ultrasonic input device 258. The touch panel 252 may use, for example, at least one of a capacitive type, a resistive type, an infrared type, and an ultrasonic type. The touch panel 252 may further include a control circuit. The touch panel 252 may further include a tactile layer, and provide a tactile reaction to the user.

The (digital) pen sensor 254 may include, for example, a recognition sheet which is a part of the touch panel or is separated from the touch panel. The key 256 may include, for example, a physical button, an optical key or a keypad. The ultrasonic input device 258 may detect, through a microphone (e.g., the microphone 288), ultrasonic waves generated by an input tool, and identify data corresponding to the detected ultrasonic waves.

The display 260 (e.g., the display 160) may include a panel 262, a hologram device 264, or a projector 266. The panel 262 may include a configuration identical or similar to the display 160 illustrated in FIG. 1. The panel 262 may be implemented to be, for example, flexible, transparent, or wearable. The panel 262 may be embodied as a single module with the touch panel 252. The hologram device 264 may show a three dimensional (3D) image in the air by using an interference of light. The projector 266 may project light onto a screen to display an image. The screen may be located, for example, in the interior of or on the exterior of the electronic device 201. According to an embodiment of the present disclosure, the display 260 may further include a control circuit for controlling the panel 262, the hologram device 264, or the projector 266. The interface 270 may include, for example, a High-Definition Multimedia Interface (HDMI) 272, a Universal Serial Bus (USB) 274, an optical interface 276, or a D-subminiature (D-sub) 278. The interface 270 may be included in, for example, the communication interface 170 illustrated in FIG. 1. Additionally or alternatively, the interface 270 may include, for example, a Mobile High-definition Link (MHL) interface, a Secure Digital (SD) card/Multi-Media Card (MMC) interface, or an Infrared Data Association (IrDA) Standard Interface.

The audio module 280, for example, may bilaterally convert a sound and an electrical signal. At least some components of the audio module 280 may be included in, for example, the input/output interface 150 illustrated in FIG. 1. The audio module 280 may process voice information input or output through, for example, a speaker 282, a receiver 284, earphones 286, or the microphone 288.

The camera module 291 is, for example, a device which may photograph a still image and a video. According to an embodiment of the present disclosure, the camera module 291 may include one or more image sensors (e.g., a front sensor or a back sensor), a lens, an Image Signal Processor (ISP) or a flash (e.g., LED or xenon lamp).

The power management module 295 may manage, for example, power of the electronic device 201. According to an embodiment of the present disclosure, the power management module 295 may include a Power Management Integrated Circuit (PMIC), a charger Integrated Circuit (IC), or a battery or fuel gauge. The PMIC may use a wired and/or wireless charging method. Examples of the wireless charging method may include, for example, a magnetic resonance method, a magnetic induction method, an electromagnetic wave method, and the like. Additional circuits (e.g., a coil loop, a resonance circuit, a rectifier, etc.) for wireless charging may be further included. The battery gauge may measure, for example, a residual quantity of the battery 296, and a voltage, a current, or a temperature while charging. The battery 296 may include, for example, a rechargeable battery and/or a solar battery.

The indicator 297 may display a particular state (e.g., a booting state, a message state, a charging state, or the like) of the electronic device 201 or a part (e.g., the processor 210) of the electronic device 201. The motor 298 may convert an electrical signal into a mechanical vibration, and may generate a vibration, a haptic effect, or the like. Although not illustrated, the electronic device 201 may include a processing device (e.g., a GPU) for supporting a mobile TV. The processing device for supporting a mobile TV may process, for example, media data according to a certain standard such as Digital Multimedia Broadcasting (DMB), Digital Video Broadcasting (DVB), or media-FLO®.

Each of the above-described component elements of hardware according to the present disclosure may be configured with one or more components, and the names of the corresponding component elements may vary based on the type of electronic device. In various embodiments, the electronic device may include at least one of the above-described elements. Some of the above-described elements may be omitted from the electronic device, or the electronic device may further include additional elements. Also, some of the hardware components according to various embodiments may be combined into one entity, which may perform functions identical to those of the relevant components before the combination.

Figure 3:
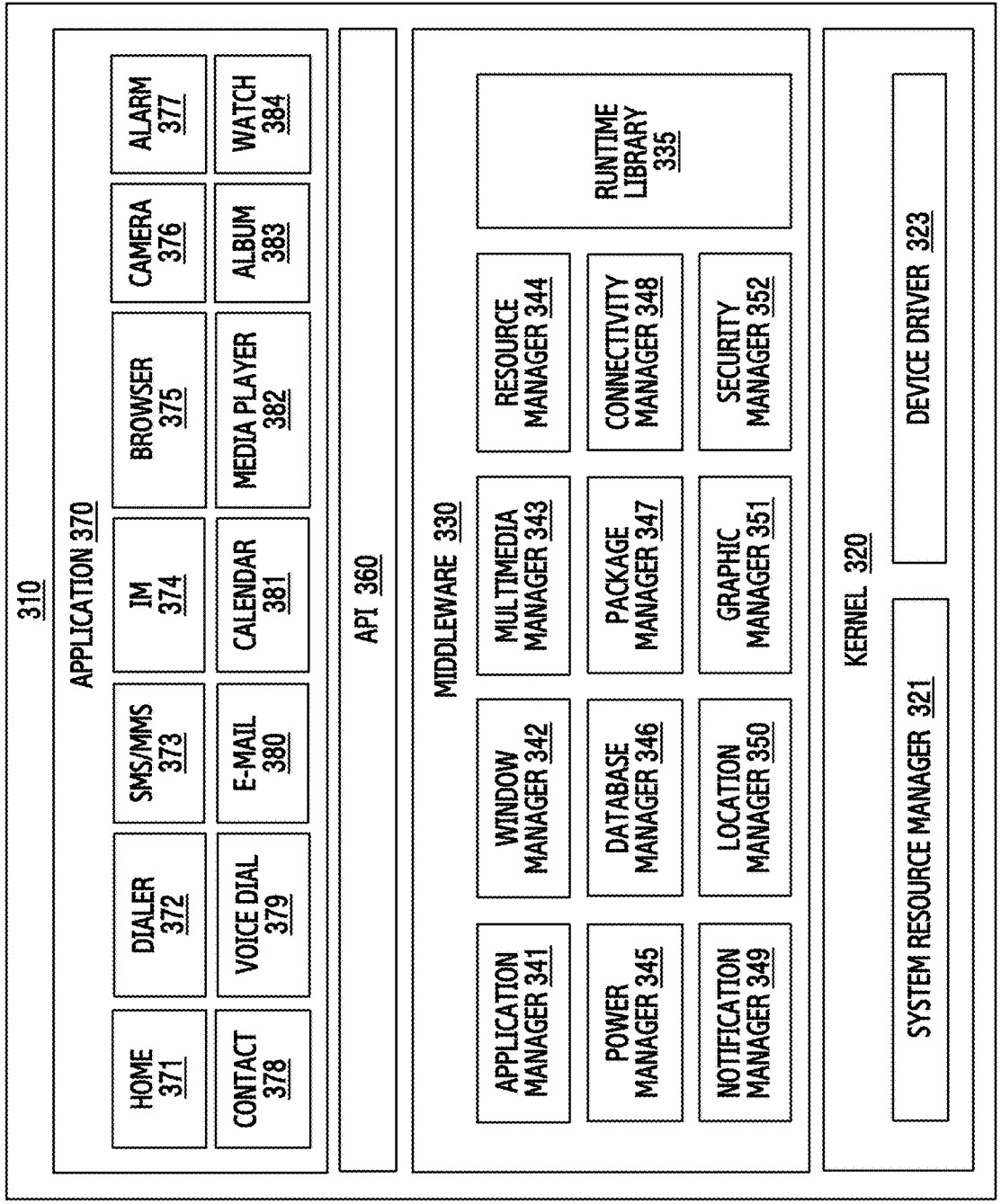
FIG. 3 is a block diagram showing a program module according to various embodiments.

FIG. 3 is a block diagram of a program module according to various embodiments of the present disclosure.

According to an embodiment of the present disclosure, the program module 310 (e.g., the program 140) may include an Operating System (OS) for controlling resources related to the electronic device (e.g., the electronic device 101) and/or various applications (e.g., the application programs 147) executed in the operating system. The operating system may be, for example, Android®, iOS®, Windows®, Symbian®, Tizen®, Bada®, or the like.

The program module 310 may include a kernel 320, middleware 330, an API 360, and/or applications 370. At least some of the program module 310 may be preloaded on an electronic device, or may be downloaded from an external electronic device (e.g., the electronic device 102 or 104, or the server 106).

The kernel 320 (e.g., the kernel 141) may include, for example, a system resource manager 321 and/or a device driver 323. The system resource manager 321 may control, allocate, or collect system resources. According to an embodiment of the present disclosure, the system resource manager 321 may include a process management unit, a memory management unit, a file system management unit, and the like. The device driver 323 may include, for example, a display driver, a camera driver, a Bluetooth® driver, a shared memory driver, a USB driver, a keypad driver, a Wi-Fi driver, an audio driver, or an Inter-Process Communication (IPC) driver.

For example, the middleware 330 may provide a function required in common by the applications 370, or may provide various functions to the applications 370 through the API 360 so as to enable the applications 370 to efficiently use the limited system resources in the electronic device. According to an embodiment of the present disclosure, the middleware 330 (e.g., the middleware 143) may include at least one of a run time library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include a library module that a compiler uses in order to add a new function through a programming language while an application 370 is being executed. The runtime library 335 may perform input/output management, memory management, the functionality for an arithmetic function, or the like.

The application manager 341 may manage, for example, a life cycle of at least one of the applications 370. The window manager 342 may manage Graphical User Interface (GUI) resources used by a screen. The multimedia manager 343 may recognize a format required for reproduction of various media files, and may perform encoding or decoding of a media file by using a codec suitable for the corresponding format. The resource manager 344 may manage resources of a source code, a memory, and a storage space of at least one of the applications 370.

The power manager 345 may operate together with, for example, a Basic Input/Output System (BIOS) or the like to manage a battery or power source and may provide power information or the like required for the operations of the electronic device. The database manager 346 may generate, search for, and/or change a database to be used by at least one of the applications 370. The package manager 347 may manage installation or an update of an application distributed in a form of a package file.

For example, the connectivity manager 348 may manage wireless connectivity such as Wi-Fi or Bluetooth. The notification manager 349 may display or notify of an event such as an arrival message, promise, proximity notification, and the like in such a way that does not disturb a user. The location manager 350 may manage location information of an electronic device. The graphic manager 351 may manage a graphic effect which will be provided to a user, or a user interface related to the graphic effect. The security manager 352 may provide all security functions required for system security, user authentication, or the like. According to an embodiment of the present disclosure, when the electronic device (e.g., the electronic device 101) has a telephone call function, the middleware 330 may further include a telephony manager for managing a voice call function or a video call function of the electronic device.

The middleware 330 may include a middleware module that forms a combination of various functions of the above-described components. The middleware 330 may provide a module specialized for each type of OS in order to provide a differentiated function. Further, the middleware 330 may dynamically remove some of the existing components or add new components.

The API 360 (e.g., the API 145) is, for example, a set of API programming functions, and may be provided with a different configuration according to an OS. For example, in the case of Android or iOS, one API set may be provided for each platform. In the case of Tizen, two or more API sets may be provided for each platform.

The applications 370 (e.g., the application programs 147) may include, for example, one or more applications which may provide functions such as a home 371, a dialer 372, an SMS/MMS 373, an Instant Message (IM) 374, a browser 375, a camera 376, an alarm 377, contacts 378, a voice dial 379, an email 380, a calendar 381, a media player 382, an album 383, a clock 384, health care (e.g., measuring exercise quantity or blood sugar), or environment information (e.g., providing atmospheric pressure, humidity, or temperature information).

According to an embodiment of the present disclosure, the applications 370 may include an application (hereinafter, referred to as an "information exchange application" for convenience of description) that supports exchanging information between the electronic device (e.g., the electronic device 101) and an external electronic device (e.g., the electronic device 102 or 104). The information exchange application may include, for example, a notification relay application for transferring specific information to an external electronic device or a device management application for managing an external electronic device.

For example, the notification relay application may include a function of transferring, to the external electronic device (e.g., the electronic device 102 or 104), notification information generated from other applications of the electronic device 101 (e.g., an SMS/MMS application, an e-mail application, a health management application, or an environmental information application). Further, the notification relay application may receive notification information from, for example, an external electronic device and provide the received notification information to a user.

The device management application may manage (e.g., install, delete, or update), for example, at least one function of an external electronic device (e.g., the electronic device 102 or 104) communicating with the electronic device (e.g., a function of turning on/off the external electronic device itself (or some components) or a function of adjusting the brightness (or a resolution) of the display), applications operating in the external electronic device, and services provided by the external electronic device (e.g., a call service or a message service).

According to an embodiment of the present disclosure, the applications 370 may include applications (e.g., a health care application of a mobile medical appliance or the like) designated according to an external electronic device (e.g., attributes of the electronic device 102 or 104). According to an embodiment of the present disclosure, the applications 370 may include an application received from an external electronic device (e.g., the server 106, or the electronic device 102 or 104). According to an embodiment of the present disclosure, the applications 370 may include a preloaded application or a third party application that may be downloaded from a server. The names of the components of the program module 310 of the illustrated embodiment of the present disclosure may change according to the type of operating system.

According to various embodiments, at least a part of the programming module 310 may be implemented in software, firmware, hardware, or a combination of two or more thereof. At least some of the program module 310 may be implemented (e.g., executed) by, for example, the processor (e.g., the processor 1410). At least some of the program module 310 may include, for example, a module, a program, a routine, a set of instructions, and/or a process for performing one or more functions.

The term "module" as used herein may, for example, mean a unit including one of hardware, software, and firmware or a combination of two or more of them. The "module" may be interchangeably used with, for example, the term "unit", "logic", "logical block", "component", or "circuit". The "module" may be a unit of an integrated component element or a part thereof. The "module" may be a unit for performing one or more functions or a part thereof. The "module" may be mechanically or electronically implemented. For example, the "module" according to the present disclosure may include at least one of an Application-Specific Integrated Circuit (ASIC) chip, a Field-Programmable Gate Arrays (FPGA), and a programmable-logic device for performing operations which has been known or are to be developed hereinafter.

According to various embodiments, at least some of the devices (for example, modules or functions thereof) or the method (for example, operations) according to the present disclosure may be implemented by a command stored in a computer-readable storage medium in a programming module form. The instruction, when executed by a processor (e.g., the processor 120), may cause the one or more processors to execute the function corresponding to the instruction. The computer-readable recoding media may be, for example, the memory 130.

Computer-readable recording media may include a hard disk, a floppy disk, a magnetic medium (e.g., a magnetic tape), an optical medium (e.g., compact disc read only memory (CD-ROM) and a digital versatile disc (DVD), a magneto-optical medium (e.g., a floptical disk)), an internal memory. The instruction may include a code generated by a complier or a code executable by an interpreter. A module or a program module according to various embodiments may include at least one of the above elements, or a portion of the above elements may be omitted, or additional other elements may be further included. According to various embodiments, operations performed by the module, the program module, or another component may be carried out sequentially, in parallel, repeatedly, or heuristically, or one or more of the operations may be executed in a different order or omitted, or one or more other operations may be added.

According to various embodiments, an electronic device 210 which is formed of a metal member may include: a memory 230; an abnormality detection circuit 483; and a processor 210 (an AP 485 of FIG. 4A) functionally connected with the memory or the abnormality detection circuit. The processor may be configured to detect whether there is an abnormality in an electric shock prevention circuit or whether a leakage path is formed in the metal member by using the abnormality detection circuit, and to control charging a battery of the electronic device according to whether there is the abnormality in the electric shock prevention circuit or whether the leakage path is formed.

The electronic device 210 may further include a display 260, and the processor may be configured to display an abnormality notification message on the display when the abnormality is detected in the electric shock prevention circuit or it is detected that the leakage path is formed in the metal member.

The electronic device 210 may further include an input and output interface (for example, the interface 270), and the processor may be configured to detect whether there is the abnormality in the electric shock prevention circuit or whether the leakage path is formed in the metal member at a time when a power supply device is connected to the input and output interface.

The processor may be configured to control the charging the battery based on at least one of whether there is the abnormality in the electric shock prevention circuit, whether the leakage path is formed, and whether the power supply device is authenticated.

The processor may be configured to determine whether the power supply device is authenticated, to allow the charging the battery when the power supply device is authenticated, and to disallow the charging the battery when the power supply device is not authenticated.

The processor may be configured to determine whether a power supply device connected to an input and output interface of the electronic device is authenticated when the abnormality of the electric shock prevention circuit is detected or it is detected that the leakage path is formed.

When the abnormality of the electric shock prevention circuit is detected or it is detected that the leakage path is formed, the processor may be configured to allow an authenticated power supply device to charge the battery and not to allow an unauthenticated power supply device to charge the battery.

The processor may be configured to display a charger risk message on a display of the electronic device when the unauthenticated power supply device is connected to the input and output interface.

When the abnormality of the electric shock prevention circuit is not detected or it is not detected that the leakage path is formed, and an unauthenticated power supply device is connected, the processor may be configured to display an electric shock risk message, and to control the charging the battery according to a user's selection.

The processor may be configured to detect whether there is a shock to the electronic device while the battery is being charged, and to control the charging the battery based on whether there is a shock to the electronic device.

The processor may be configured to stop the charging the battery and to identify whether there is an abnormality in the electric shock prevention circuit when the shock to the electronic device is detected while the battery is being charged, and, to resume the charging the battery when the abnormality of the electric shock prevention circuit is not detected.

The processor may be configured to stop the charging the battery and identify whether there is an abnormality in the electric shock prevention circuit when the shock to the electronic device is detected while the battery is being charged, and to display an abnormality notification message and to stop the charging the battery when the abnormality of the electric shock prevention circuit is detected.

The processor may be configured to detect a grip state of the electronic device while the battery is being charged, when the electronic device is gripped, to stop the charging the battery and to determine whether a power supply device connected to an input and output interface of the electronic device is authenticated, and, when the power supply device is authenticated, to resume the charging the battery.

The processor may be configured to display an electric shock risk message when the power supply device is not authenticated, and to resume the charging the battery or finish the charging the battery based on a grip state of the electronic device and whether the power supply device is connected.

Figure 4A:
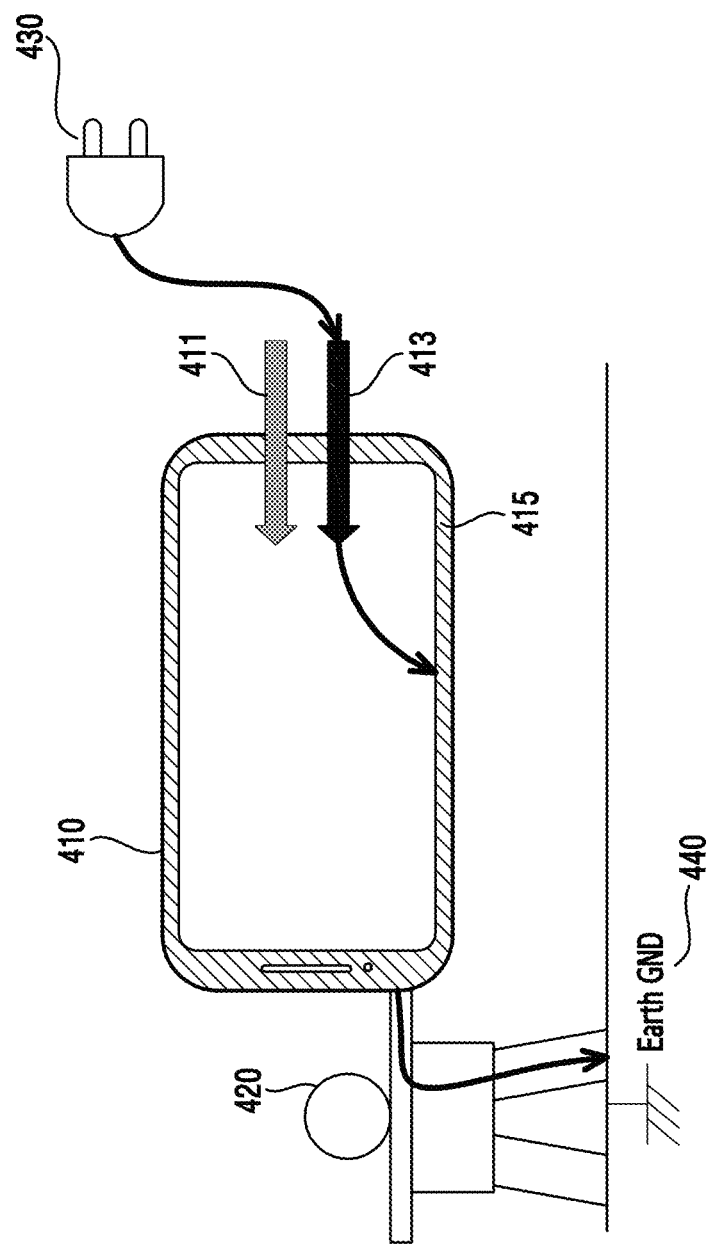
FIG. 4A and FIG. 4B are views showing an example of controlling a leakage current according to various embodiments.
Figure 4B:
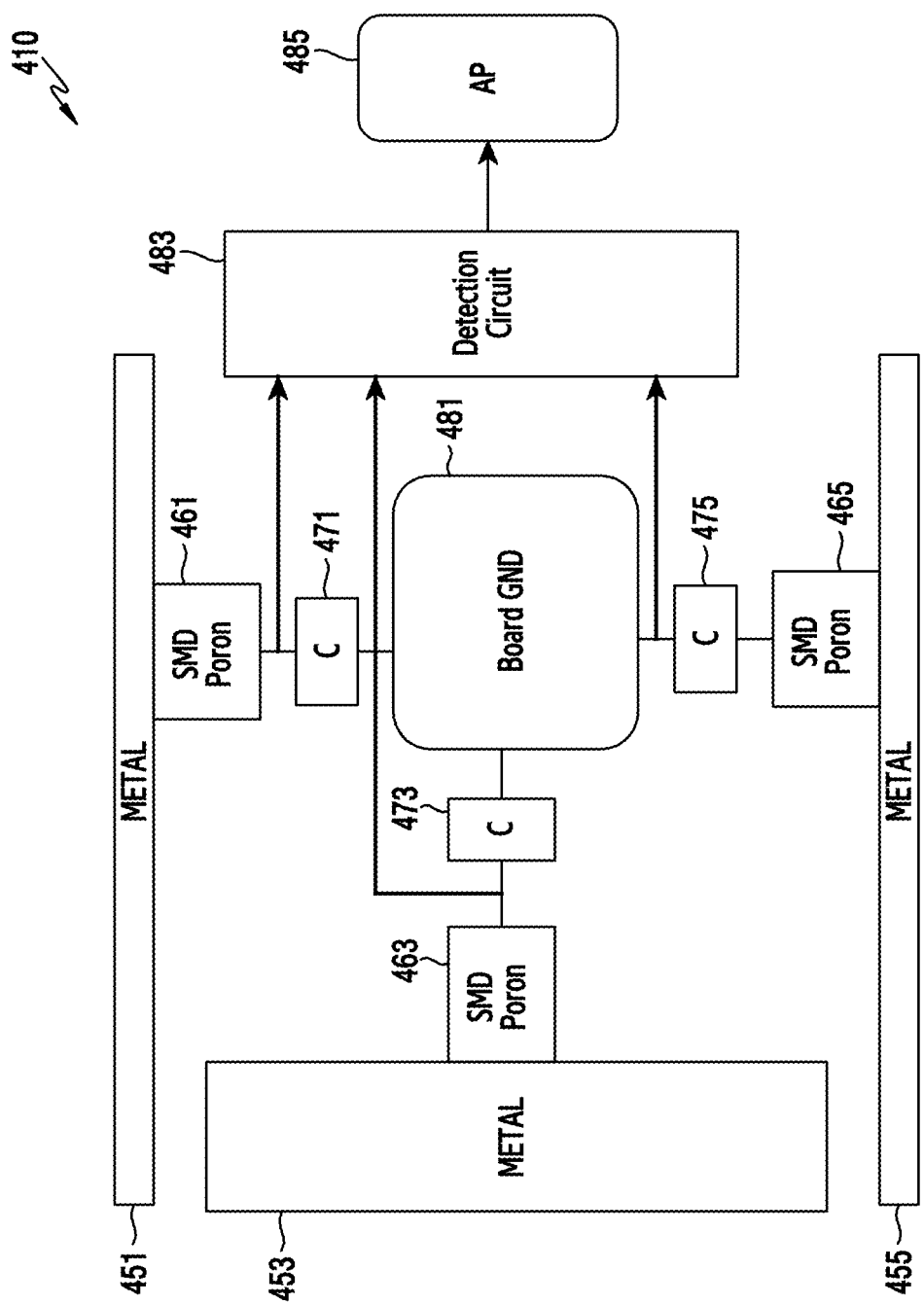

FIGS. 4A and 4B are views showing an example of controlling a leakage current according to various embodiments.

FIG. 4A is a view showing an example of a leakage current being formed in an electronic device. Power supply device 430 may connect a power supply such as a power outlet to a ground terminal 411 and reception terminal 413, sometimes referred to as the "positive terminal" or "live terminal." As a result, there may be a leakage current to the metal member 415 of the electronic device 410. When gripped by the user 420, the body of the user 420 may complete a circuit to the Earth ground (GND). The current passing through the user 420 may cause severe injury or may even be lethal.

Referring to FIG. 4A, the electronic device 410 may have an exterior (for example, a shaded portion) surrounding a housing thereof and formed of a metal member 415 (or metal), and may use a portion of the metal 415 as an antenna. The electronic device 410 may have four side surfaces, forming a rectangular shape, entirely formed of the metal member 415 or may have at least two side surfaces formed of the metal member 415. According to an embodiment, the side surface of the electronic device 410 may refer to a portion connecting a front surface of the electronic device (for example, a surface on which a display is mounted), and a rear surface (for example, a surface opposite the surface on which the display is mounted). In addition, a portion extending from the side surface to the front surface (for example, the metal member 415 of FIG. 4A) or a portion extending from the side surface to the rear surface may be formed of a metal member. However, this is merely an implementation example, and the electronic device is not limited by the description.

The electronic device 410 may be connected with a power supply device 430 via an input and output interface. For example, the input and output interface may refer to the input and output interface 150 of FIG. 1 or the interface 270 of FIG. 2. The input and output interface may be used to connect the electronic device 410 to an external device as a USB connector. The external device may refer to the power supply device 430, a computer, a storage device, etc. The input and output interface may include a ground terminal 411 and a signal transmission and reception terminal 413 (for example, a power transmission and reception terminal). The electronic device 410 may receive a current from the power supply device 430 via the signal transmission and reception terminal 413. According to an embodiment of the present disclosure, the power supply device 430 may refer to a charger (travel adapter). The power supply device 430 may be a fast charger a normal charger. In addition, the power supply device 430 may be a wired charger or a wireless charger.

According to an embodiment of the present disclosure, when the power supply device 430 is connected to the electronic device 410, a leakage path may include a portion of the metal 415 of the electronic device 410. When a user 420 grips the electronic device 410 with the electronic device 410 being connected to the power supply device 430, a leakage current may pass through the body of the user 420 and may flow to a surface of the earth 440. In this case, the user may have a high risk of electric shock. This is particularly the case if the user is barefoot and has recently bathed, thereby reducing the body's electrical resistance. When the power supply device 430 is an unauthenticated product (for example, a non-genuine product), there is a higher risk of electric shock compared to an authenticated charger (for example, a genuine product).

To solve this problem, the electronic device 410 may have an electric shock prevention circuit mounted therein.

FIG. 4B is a view showing an example of an electric shock prevention circuit being mounted in the electronic device.

Referring to FIG. 4B, the electronic device 410 may have surface mounted components (for example, surface mount device porons 461, 463, 465) mounted on surfaces contacting metal members 451, 453, 455, and may have electric shock prevention circuits 471, 473, 475 mounted between the surface mounted components 461, 463, 465 and respective components (for example, a board GND 481, an AP 485) of the electronic device 410. The surface mounted components 461, 463, 465 and the electric shock prevention circuits 471, 473, 475 may be connected to the board GND 481. The electric shock prevention circuits 471, 473, 475 may protect to prevent a current from flowing to the metal members 451, 453, 455. The electric shock prevention circuits may refer to any of circuit breakers, surge protectors, or fuses, to name a few. The metal is a conductive material and allows a current to flow therethrough, and the user may have the risk of electric shock as shown in FIG. 4A when a current flows, since the user grips the metal members 451, 453, 455 of the electronic device 410. Because, the electric shock prevention circuits 471, 473, 475 are damaged by an impact force to the electronic device 410, and non-intended current is applied to the metal members 451, 453, and 453 by the damaged electric shock prevention circuits 471, 473, 475.

For example, when the power supply device 430 is not connected to the electronic device 410, a leakage path may not be formed between power supply and the metal members 451, 453, 455. When the power supply device 430 is connected to the electronic device 410, a leakage path may be formed between power supply and the metal members 451, 453, 455. When the electric shock prevention circuits 471, 473, 475 mounted in the electronic device 410 are normally operated, excessive current will not flow to the metal members 451, 453, 455, even when the power supply device 430 is connected to the electronic device 410. According to an embodiment of the present disclosure, when the electric shock prevention circuits 471, 473, 475 mounted in the electronic device 410 are normally operated, but a power supply device 430 that is not authenticated as guaranteeing safety is connected to the electronic device 410, a excessive leakage current may flow to metal members 451, 453, and 455.

According to an embodiment of the present disclosure, when the electric shock prevention circuits 471, 473, 475 mounted in the electronic device 410 are damaged, and the power supply device 430 is connected to the electronic device 410, a excessive leakage current may flow to metal members 451, 453, and 455. However, when the electric shock prevention circuits 471, 473, 475 mounted in the electronic device 410 are damaged, but the power supply device 430 that is authenticated as guaranteeing safety is connected to the electronic device 410, excessive leakage current will not flow to the metal members 451, 453, 455. According to an embodiment of the present disclosure, when at least one of the electric shock prevention circuits 471, 473, 475 mounted in the electronic device 410 is damaged and the power supply device 430 that is not authenticated as guaranteeing safety is connected to the electronic device 410, excessive leakage current may flow to the metal members 451, 453, 455. For example, when the electric shock prevention circuits 471, 473, 475 are damaged, alternating current (AC) power generated by the power supply device 430 that is not authenticated as guaranteeing safety may cause excessive leakage current flow between the electronic device 410 and the user 420. That is, when the power supply device 430 that is not authenticated is connected, excessive leakage current may flow from ground 481. In addition, when the electric shock prevention circuits 471, 473, 475 are damaged, the excessive leakage current might not be prevented from flowing to the metal members 451, 453, 455.

The electronic device 410 may perform an operation for preventing a user's electric shock according to whether the power supply device 430 connected thereto is authenticated or whether the electric shock prevention circuits 471, 473, 475 are damaged. To achieve this, the electronic device 410 may detect whether the electric shock prevention circuits 471, 473, 475 are abnormal (or damaged) by using an abnormality detection circuit 483. The abnormality detection circuit 483 may determine whether a leakage path is formed in at least a portion of the metal members 451, 453, 455 according to whether the electric shock prevention circuits 471, 473, 475 are abnormal (or is damaged) or due to a mechanical defect or damage. The abnormality detection circuit 483 may be connected between the electric shock prevention circuits 471, 473, 475 and the surface mounted components 461, 463, 465 to detect whether excessive, or an amount of electric current exceeding predetermined threshold, flows through the electric shock prevention circuits 471, 473, 475.

In certain embodiments, the abnormality prevention circuit 483 can be an amp meter that measures the current flowing from electric shock prevention circuits 471, 473, 475, or an ohmmeter that measures the electrical resistance between the board GND 481 and the metal members 451, 453, 455. When the measured current exceeds a predetermined amount or the measured electrical resistance is below a predetermined amount, the abnormality detection circuit 483 determines that one of electric shock prevention circuits 471, 473, 475 is damaged.

According to an embodiment of the present disclosure, when the electric shock prevention circuits 471, 473, 475 are damaged, a short circuit may be caused between the electric shock prevention circuits 471, 473, 475 and the surface mounted components 461, 463, 465 and an electric current may flow. When an excessive electric current flows between the electric shock prevention circuits 471, 473, 475 and the surface mounted components 461, 463, 465, the abnormality detection circuit 483 may determine that the electric shock prevention circuits 471, 473, 475 are damaged. According to various embodiments, the abnormality detection circuit 483 may include various active elements or passive elements such as a bipolar junction transistor (BJT), a metal oxide silicon field effect transistor (MOSFET), a switch, a resistor (R), an inductor (L), a capacitor (C), etc.

The four side surfaces of the electronic device 410 may be formed of a metal member, and the abnormality detection circuit 483 may identify which of the electric shock prevention circuits mounted on the four side surfaces is damaged. According to an embodiment of the present disclosure, the abnormality detection circuit 483 may detect abnormality of at least one of the plurality of electric shock prevention circuits regardless of a damage location. The abnormality detection circuit 483 may detect whether a excessive leakage current flows from board GND 481 to metal member 451, 453, 455 due to a damage or a mechanical defect of the electric shock prevention circuits 471, 473, 475. When abnormality is detected in the electric shock prevention circuit, the abnormality detection circuit 483 may transmit circuit abnormality information to a processor 485 (AP). The processor 485 may store the circuit abnormality information of the electric shock prevention circuit in a memory (for example, the memory 130, the memory 230).

Although FIG. 4B depicts that the three side surfaces of the electronic device are formed of metal members, the metal members of the electronic device may be formed on all of the four side surfaces of the electronic device forming a rectangular shape.

According to various embodiments, the electronic device 410 might not have an electric shock prevention circuit mounted therein, and may detect whether a excessive leakage current flows from board GND 481 to the metal members 451, 453, 455. The electronic device 410 may connect the abnormality detection circuit 483 to the metal members 451, 453, 455, and may detect whether a leakage path is formed in at least one of the metal members 451, 453, 455 by using the abnormality detection circuit 483.

Figure 5:
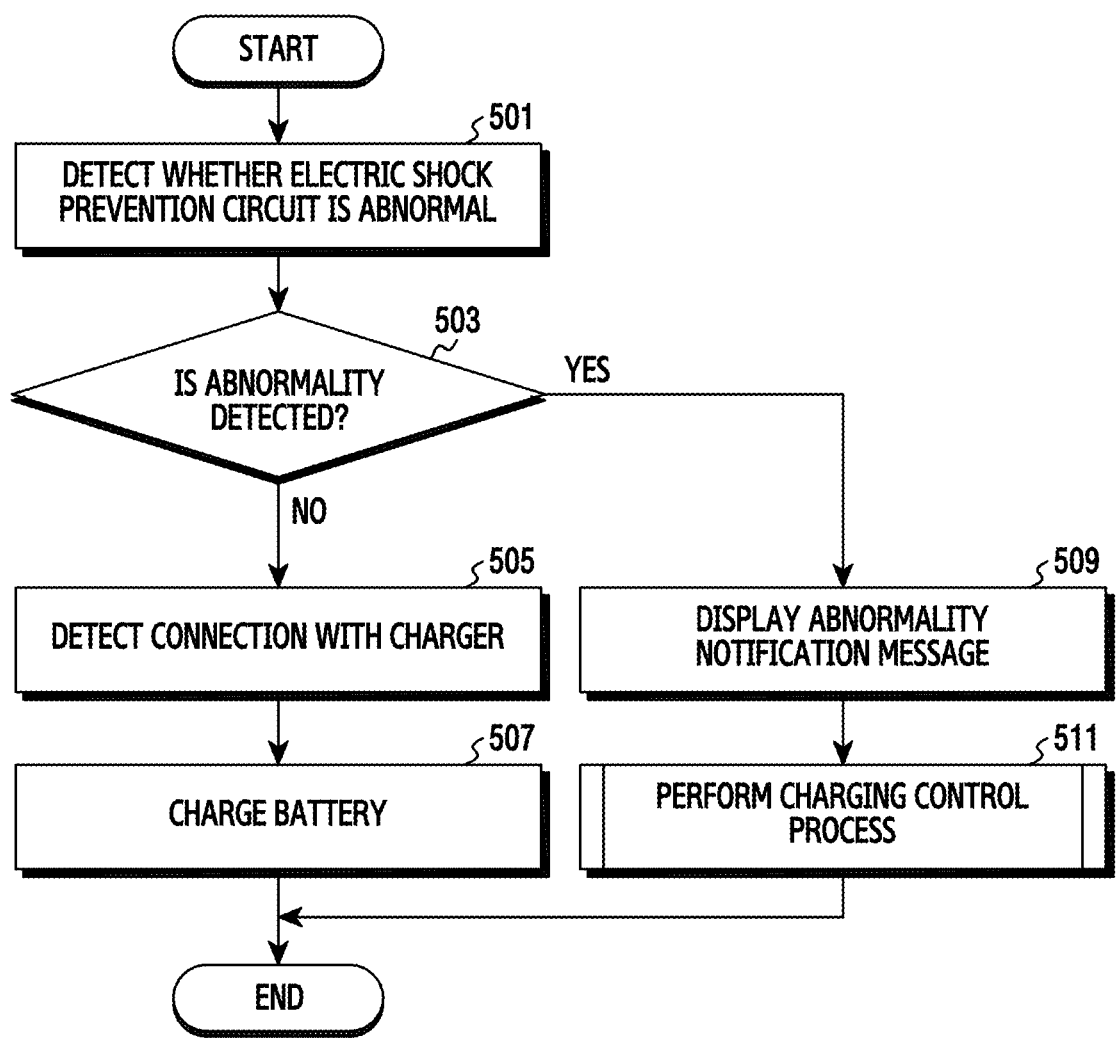
FIG. 5 is a flowchart showing a method for preventing an electric shock of an electronic device according to various embodiments.

FIG. 5 is a flowchart showing a method for preventing an electric shock of the electronic device according to various embodiments.

Referring to FIG. 5, in operation 501, the electronic device 410 (for example, the processor 485) may detect whether an electric shock prevention circuit (for example, the electric shock prevention circuits 471, 473, 475 of FIG. 4) is abnormal. According to an embodiment of the present disclosure, the processor 485 may receive information regarding whether the electric shock prevention circuit (for example, the electric shock prevention circuits 471, 473, 475) is abnormal from an abnormality detection circuit (for example, the abnormality detection circuit 483). The abnormality detection circuit 483 may detect whether the electric shock prevention circuit is abnormal (or is damaged) or whether a leakage path is formed in a metal member. When a damage to the electric shock prevention circuit is detected or it is detected that a leakage path is formed, the abnormality detection circuit 483 may transmit circuit abnormality information to the processor 485. According to various embodiments, the abnormality detection circuit 483 may detect whether the electric shock prevention circuit is abnormal or whether a leakage path is formed in a metal member in real time.

According to various embodiments, the abnormality detection circuit 483 may detect whether the electric shock prevention circuit is abnormal or whether a leakage is formed in the metal member under control of the processor 485. For example, when an impact force greater than or equal to a reference value is detected in the electronic device 401, the processor 485 may instruct the abnormality detection circuit 483 to identify whether the electric shock prevention circuit is abnormal. The reference value may be set based on the electric shock prevention circuit. For example, the impact force reference value may be set based on identifying whether an impact force enough to damage the electric shock prevention circuit is exerted or not. Accordingly, a different impact force reference value may be set according to a circuit design of the electric shock prevention circuit. According to an embodiment of the present disclosure, when a charger (for example, the power supply device 430) is connected to the electronic device 410, the processor 485 may instruct the abnormality detection circuit 483 to identify whether the electric shock prevention circuit is abnormal or whether a leakage path is formed in the metal member. According to an embodiment, when the charger connected to the electronic device 410 is not an authenticated charger (for example, a non-genuine charger), the processor 485 may instruct the abnormality detection circuit 483 to identify whether the electric shock prevention circuit is abnormal.

In operation 503, the electronic device 410 (for example, the processor 485) may determine whether an abnormality is detected. The processor 485 may receive the circuit abnormality information from the abnormality detection circuit 483, and may identify whether the electric shock prevention circuit is abnormal or whether a leakage path is formed in the metal member. According to various embodiments, the processor 485 may determine whether at least one of the plurality of electric shock prevention circuits is abnormal regardless of a damage location. According to various embodiments, the processor 485 may determine which of the plurality of electric shock prevention circuits is abnormal. For example, the four side surfaces of the electronic device 410 may be formed of metal members and electric shock prevention circuits may be mounted on the four side surfaces, respectively. The abnormality detection circuit 483 may identify which of the electric shock prevention circuits mounted on the four side surfaces is damaged.

According to an embodiment of the present disclosure, when an abnormality is detected (for example, when the circuit abnormality information is detected), the processor 485 may perform operation 509, and, when an abnormality is not detected (for example, when the circuit abnormality information is not detected), the processor 485 performs operation 505.

When the circuit abnormality information is not detected, the electronic device 401 (for example, the processor 485) may detect a connection with a charger in operation 505. The processor 485 may determine whether a charger is connected to the input and output interface (for example, the interface 270) of the electronic device 410. The charger may refer to the power supply device 430 of FIG. 4A, and may perform fast charging (for example, adaptive fast charging (AFC) or normal charging. The power supply device 430 may supply power by using various protocols (or charging methods). A voltage or current charged by the power supply device 430 may vary according to a protocol. In addition, the power supply device 430 may be a wired charger or a wireless charger.

In operation 507, the electronic device 410 (for example, the processor 485) may charge a battery. The battery (for example, the battery 296) may be mounted in the electronic device 410 or may be removable from the electronic device 410. The processor 485 may charge the battery with power supplied from the power supply device 430. The electronic device 410 may include a power management integrated circuit (PMIC), a charging IC, or a power gauge related to battery charging. The PMIC may have a wired charging method and/or a wireless charging method. The charging IC may control the battery charging. The power gauge (or a battery remaining capacity measurement IC) may measure a remaining capacity of the battery, a voltage, a current, or temperature while the battery is being charged.

According to various embodiments, a ground terminal (for example, the ground terminal 411) of the input and output interface (for example, the interface 270) connected with the power supply device 430 may be designed to be disconnectable. When the battery is not being charged, the processor 485 may open a switch connecting the ground terminal 411 to a board ground (for example, the board GND 481) of the electronic device 410, thereby preventing a common ground. When the battery is being charged, the processor 485 may control the ground terminal 411 to be connected to the board ground 481. The processor 485 may have a switch disposed between the ground terminal 411 and the board ground 481, and may control a connection between the ground terminal 411 and the board ground 481 by switching on/off the switch.

That is, normally (for example, when the power supply device 430 is not connected), the processor 485 may maintain the ground terminal 411 in the open state (for example, switch on), and, only when the power supply device 430 is connected, the processor 485 may switch the ground terminal 411 to the close state (for example, switch off) and control the ground terminal 411 to be connected to the board ground. According to an embodiment of the present disclosure, when the power supply device 430 is an authenticated charger, the processor 485 may connect the ground terminal 411 to the board ground 481. When the power supply device 430 is an unauthenticated charger, the processor 485 may open the ground terminal 411 and prevent the ground terminal 411 from being connected to the board ground 481.

According to various embodiments, the ground terminal 411 may be designed to be unable to be detachable from the board GND 481. When the ground terminal 411 is designed to be unable to be disconnected from the board ground, the processor 485 may control charging based on whether the power supply device 430 is an authenticated charger. For example, the processor 485 may allow charging only when the power supply device 430 is an authenticated charger. According to an embodiment of the present disclosure, when the power supply device 430 is not an authenticated charger, the processor 485 may determine whether to allow charging based on whether a leakage path is formed from board ground 481 to a metal member 451, 453, 455 of the electronic device 410. When the power supply device 430 is not an authenticated charger and a leakage path is formed from board ground 481 to a metal member 451, 453, 455 of the electronic device 410, the processor 485 may stop charging. When the power supply device 430 is not an authenticated charger and a leakage path is not formed from board ground 481 to a metal member 451, 453, 455 of the electronic device 410, the processor 485 may allow charging.

When the circuit abnormality information is detected, the electronic device 410 (for example, the processor 485) may display an abnormality notification message in operation 509. The abnormality notification message may include at least one of a text, an image or a video for alerting a user to a risk of electric shock. For example, the abnormality notification message may include a text "There is a risk of electric shock. Please visit the nearest repair shop." According to an embodiment of the present disclosure, the abnormality notification message may include a text "There would be a risk of electric shock if a charger that is not authenticated for safety is used. Please visit the nearest repair shop." The abnormality notification message may include an icon for warning of the risk of electric shock along with the text.

According to various embodiments, the processor 485 may stop charging the battery at the same time as displaying the abnormality notification message.

In operation 511, the electronic device 410 (for example, the processor 485) may perform a charging control process. The charging control process may include an operation of controlling charging when there is an abnormality in the electric shock prevention circuit (for example, the electric shock prevention circuits 471, 473, 475). For example, when an abnormality is detected in the electric shock prevention circuit (for example, the electric shock prevention circuits 471, 473, 475), the processor 485 may allow charging only when the authenticated power supply device 430 is connected. In addition, when an unauthenticated power supply device 430 is connected, the processor 485 may stop charging and may display an electric shock risk message.

Whether a charging device is authenticated (or in some embodiments, from the Original Equipment Manufacturer (OEM) can be determined by whether or not electronic device receives a predetermined electrical signature.

In FIG. 5, operation 509 is performed and then operation 511 is performed. However, operations 509 and 511 may be performed simultaneously.

Figure 6:
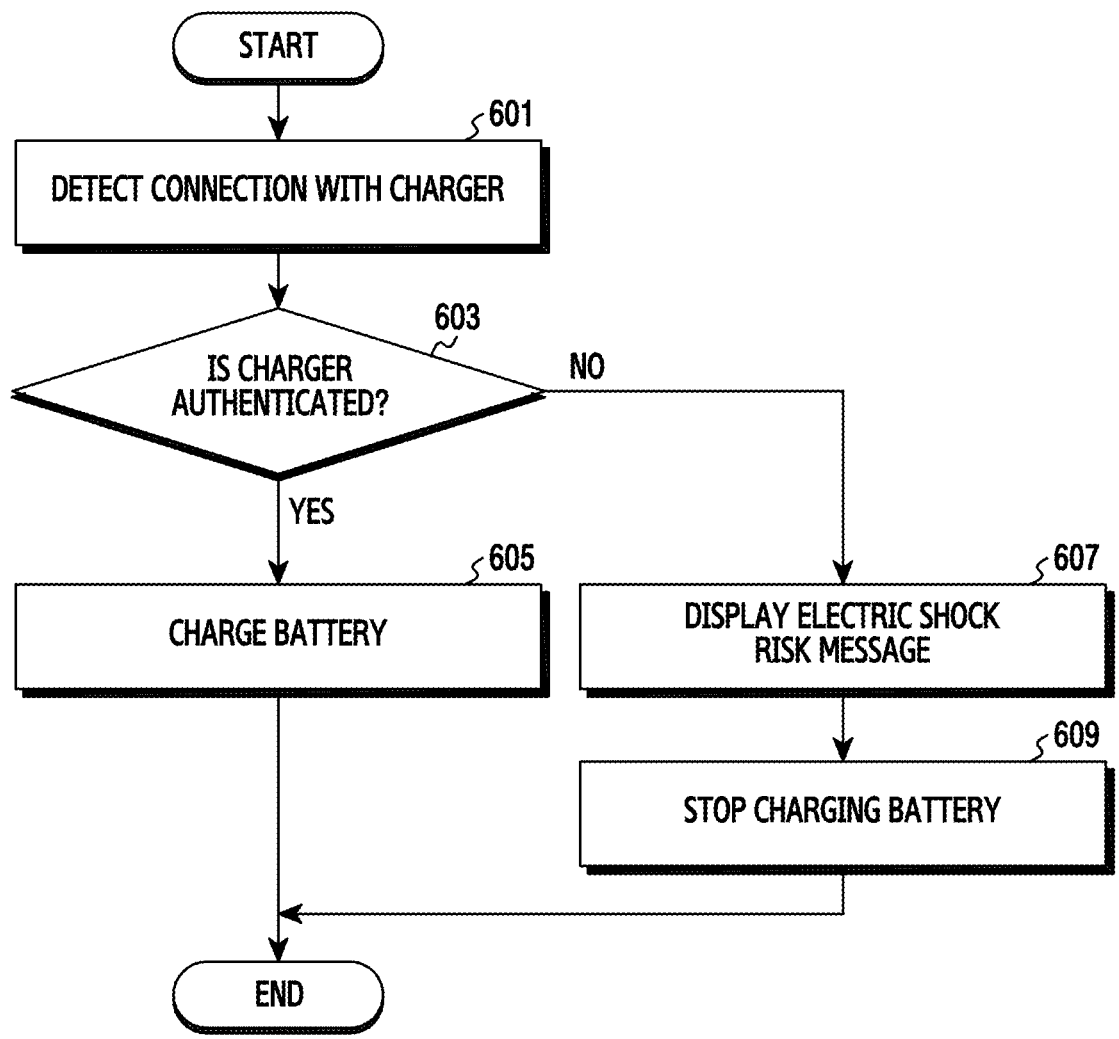
FIG. 6 is a flowchart showing a method for controlling charging of an electronic device according to various embodiments.

FIG. 6 is a flowchart showing a method for controlling charging of an electronic device according to various embodiments of the present disclosure. FIG. 6 is a sub routine of operation 511 of FIG. 5. That is, FIG. 6 illustrates operation 511 in detail.

Referring to FIG. 6, in operation 601, the electronic device 410 (for example, the processor 485) may detect a connection with a charger (for example, the power supply device 430). The processor 485 may determine whether a charger is connected to the input and output interface (for example, the interface 270) of the electronic device 410. The charger may refer to the power supply device 430 of FIG. 4A. Since operation 601 is the same as or similar to operation 505, a detailed description thereof is omitted.

According to various embodiments, when being connected with the charger, the processor 485 may detect whether an electric shock prevention circuit (for example, the electric shock prevention circuits 471, 473, 475) is abnormal or a leakage path from board ground 481 to a metal member 451, 453, 455 is formed by using the abnormality detection circuit 483, or may identify whether circuit abnormality information is stored in the memory 230. The flowchart of FIG. 6 describes an embodiment when an abnormality of the electric shock prevention circuit is detected or a leakage path from board ground 481 to a metal member 451, 453, 455 is formed. For example, the processor 485 may receive circuit abnormality information of the electric shock prevention circuit (for example, the electric shock prevention circuits 471, 473, 475) from the abnormality detection circuit 483, and may store the received circuit abnormality information in the memory 230. The circuit abnormality information may include information indicating whether there is an abnormality in at least one electric shock prevention circuit or whether there is a leakage path from board ground 481 to a metal member 451, 453, 455 or not. According to an embodiment of the present disclosure, the circuit abnormality information may include identification information of the electric shock prevention circuit in which an abnormality is detected. According to various embodiments, the electronic device 410 may have four side surfaces formed of metal members, and may have an electric shock prevention circuit mounted on each of the four side surfaces. Accordingly, the circuit abnormality information of the electric shock prevention circuit may include identification information of the electric shock prevention circuit indicating in which electric shock prevention circuit an abnormality is detected from among the four electric shock prevention circuits.

In operation 603, the electronic device 410 (for example, the processor 485) may determine whether the connected charger is an authenticated charger (for example, the power supply device 430). When an abnormality of the electric shock prevention circuit (for example, the electric shock prevention circuits 471, 473, 475) is detected, or a leakage path from board ground 481 to a metal member 451, 453, 455 is formed, the processor 485 may control charging based on whether the charger is authenticated. For example, since the processor 485 detects the abnormality of the electric shock prevention circuit (for example, the electric shock prevention circuits 471, 473, 475) or detects that the leakage path from board ground 481 to a metal member 451, 453, 455 formed, the processor 485 may allow only an authenticated charger to charge, and may not allow an unauthenticated charger to charge. For example, when a charger is connected, the processor 485 may receive charger identification information (for example, a charger number, a charger ID, etc.) from the charger, and may determine that the charger is an authenticated charger when the received identification information matches predetermined identification information. The processor 485 may determine that the charger is an unauthenticated charger when the received identification information does not match the predetermined identification information.

When the connected charger is the authenticated charger, the processor 485 may perform operation 605, and, when the connected charger is not the authenticated charger, the processor 485 may perform operation 607.

When the charger is the authenticated charger, the electronic device 410 (for example, the processor 485) may charge a battery (for example, the battery 296) of the electronic device 410 in operation 605. For example, the processor 485 may charge the battery by connecting a ground terminal (for example, the ground terminal 411) of the input and output interface to a board ground (for example, the board ground 481) of the electronic device 410. The processor 485 may connect the ground terminal 411 to the board ground 481 by turning on an on/off switch connected to the ground terminal 411. Since operation 605 of charging the battery is the same as or similar to operation 507 of charging the battery in FIG. 5, a detailed description thereof is omitted.

When the connected charger is not the authenticated charger, the electronic device 410 (for example, the processor 485) may display an electric shock risk message in operation 607. The electric shock risk message may include at least one of a text, an image, or a video informing that there is a risk of electric charge when an unauthenticated charger is connected. For example, the electric shock risk message may include a text "Charging is stopped because there is a risk of electric charge. Please visit the nearest repair shop." According to an embodiment of the present disclosure, the electric shock risk message may include a text "The charger is not authenticated for safety. Charging is stopped because there is a risk of electric charge. Please visit the nearest repair shop." The electric shock risk message may include an icon for warning of the risk of electric shock along with the text. The electric shock risk message may be the same as, similar to, or different from the above-mentioned abnormality notification message.

In operation 609, the electronic device 410 (for example, the processor 485) may stop charging the battery. When an abnormality of the electric shock prevention circuit (for example, the electric shock prevention circuits 471, 473, 475) is detected or it is detected that a leakage path is formed, and an unauthenticated charger (for example, the power supply device 430) is connected, the processor 485 may control not to charge the battery. For example, since operation 609 is a sub routine of operation 511 of FIG. 5, operation 509 of stopping charging the battery may be maintained in operation 609.

FIG. 6 depicts that operation 607 is performed and then operation 609 is performed. However, operations 607 and 609 may be performed simultaneously.

Figure 7A:
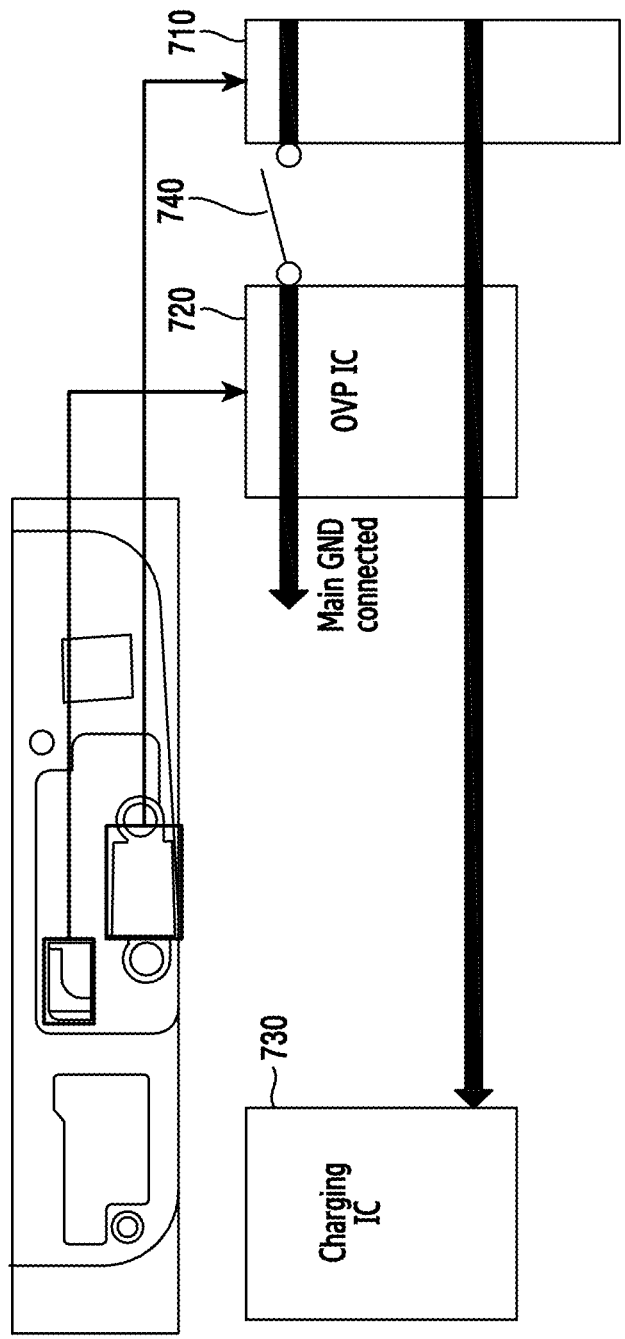
FIG. 7A and FIG. 7B are views showing an example of disconnecting a ground of a charger interface according to various embodiments.
Figure 7B:
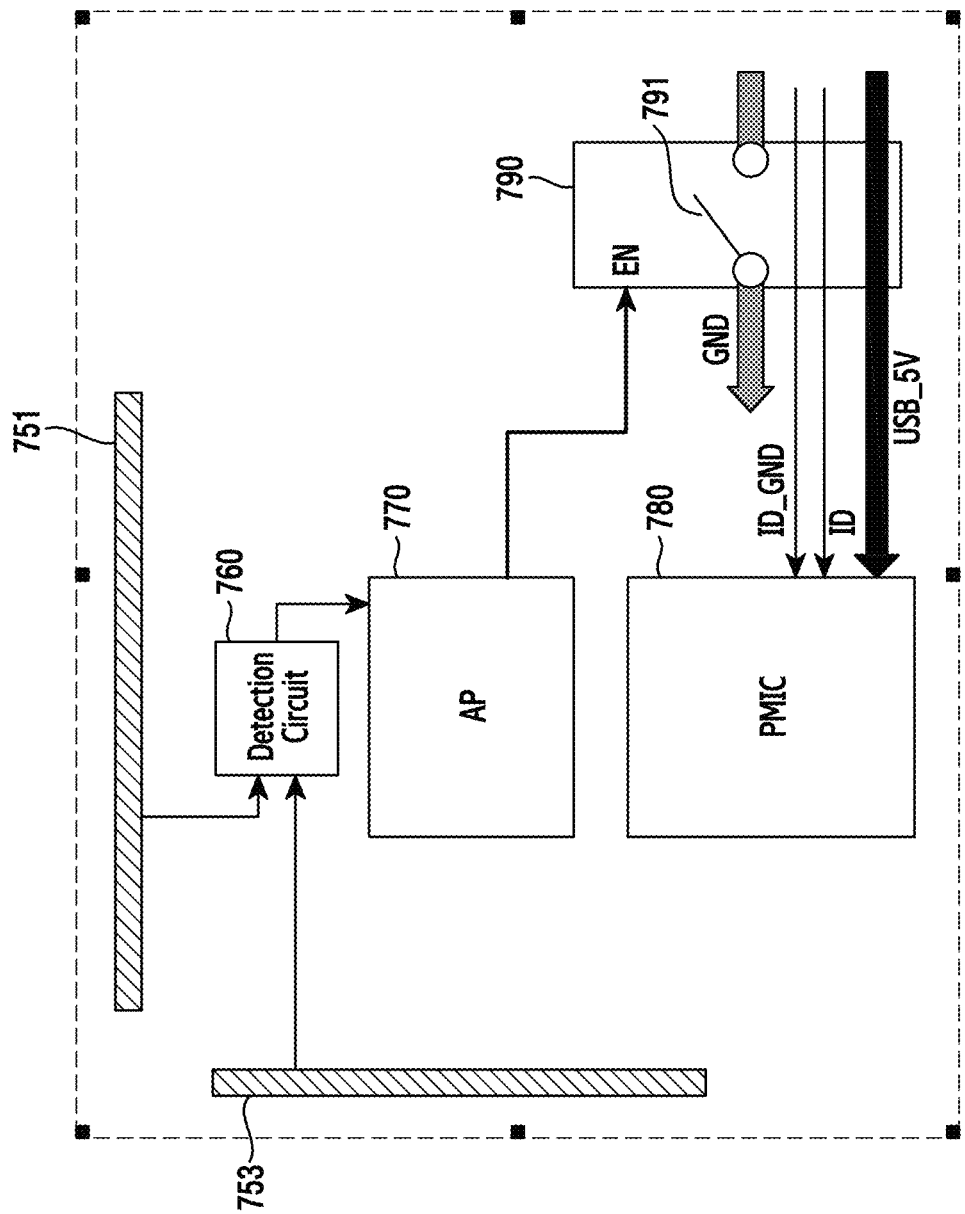

FIGS. 7A and 7B are views showing an example of disconnecting a ground of an input and output interface according to various embodiments.

FIG. 7A is a view showing an example of disconnecting a ground of an input and output interface (for example, the interface 270).

Referring to FIG. 7A, the electronic device 410 may disconnect a ground terminal (for example, the ground terminal 411) of an input and output interface 710 connected with a charger (for example, the power supply device 430) from a main ground (for example, the board ground 481). For example, the ground terminal of the input and output interface 710 may be disconnected from a ground terminal of an over voltage protection IC (OVP IC) 720. The electronic device 410 may have a switch 740 mounted between the ground terminal of the input and output interface and the ground terminal of the over voltage protection IC 720. Usually when a charger is not connected, the electronic device 410 may always turn off the switch 740. When a charger is connected, the electronic device 410 may turn on the switch 740 to allow a current supplied from the charger to flow to a charging IC 730.

Although FIG. 7A depicts that the switch 740 is disposed between the input and output interface 710 and the over voltage protection IC 720, the switch 740 may be mounted inside the input and output interface 710 or inside the over voltage protection IC 720. That is, the switch 740 may be disposed at a position so as to prevent the ground terminal of the input and output interface 710 connected with the charger from being directly connected with the main ground of the electronic device 410. For example, the switch 740 may be disposed at any position where a metal member and the main ground of the electronic device 410 are connected with each other.

FIG. 7B is a view showing an example of disconnecting a ground of an over voltage prevention circuit.

Referring to FIG. 7B, the electronic device 410 may have an abnormality detection circuit 760 connected to metal members 751, 753 (for example, the metal members 451, 453, 455), and may have the abnormality detection circuit 760 (for example, the abnormality detection circuit 483) connected to an application processor (AP) 770. The abnormality detection circuit 760 may detect whether a leakage path (or an electric shock path) from board ground 481 to the metal members 751, 753 is formed. An electric shock prevention circuit may be mounted between the metal members 751, 753 and the abnormality detection circuit 760, or may not be mounted. In addition, the electronic device 410 may have a switch 791 mounted in an over voltage prevention circuit 790 connected with the ground terminal of the input and output interface 710. The AP 770 (for example, the processor 485) may control the switch 791 so as not to directly connect the ground terminal connected with a charger (for example, the power supply device 430) to the main ground. For example, when an authenticated charger is connected, the AP 770 may turn on the switch 791 to transmit an electric current supplied from the charger to a PMIC 780. When an unauthenticated charger is connected, the AP 770 may turn off the switch 791 so as not to supply an electric current from the charger. The AP 770 may determine whether the charger is authenticated or not based on identification information of the charger connected to the electronic device.

Figure 8A:
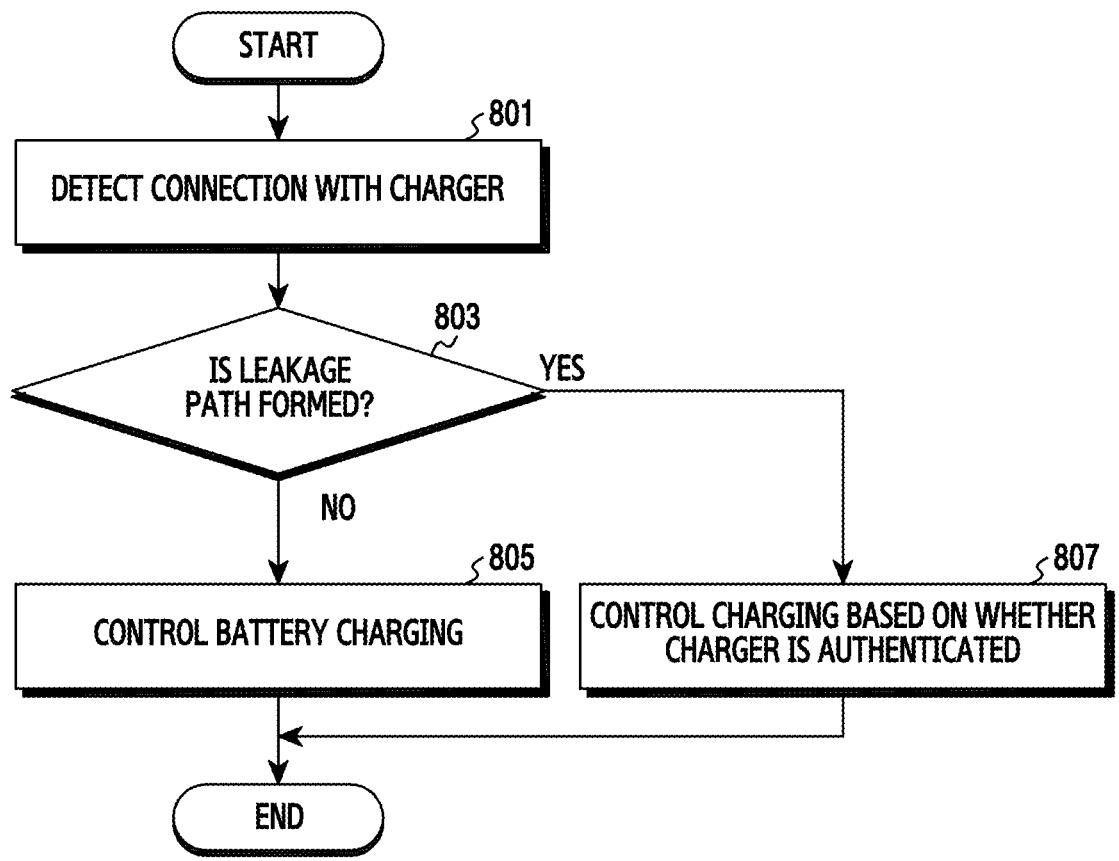
FIG. 8A and FIG. 8B are flowcharts showing a method for operating of an electronic device according to various embodiments.
Figure 8B:
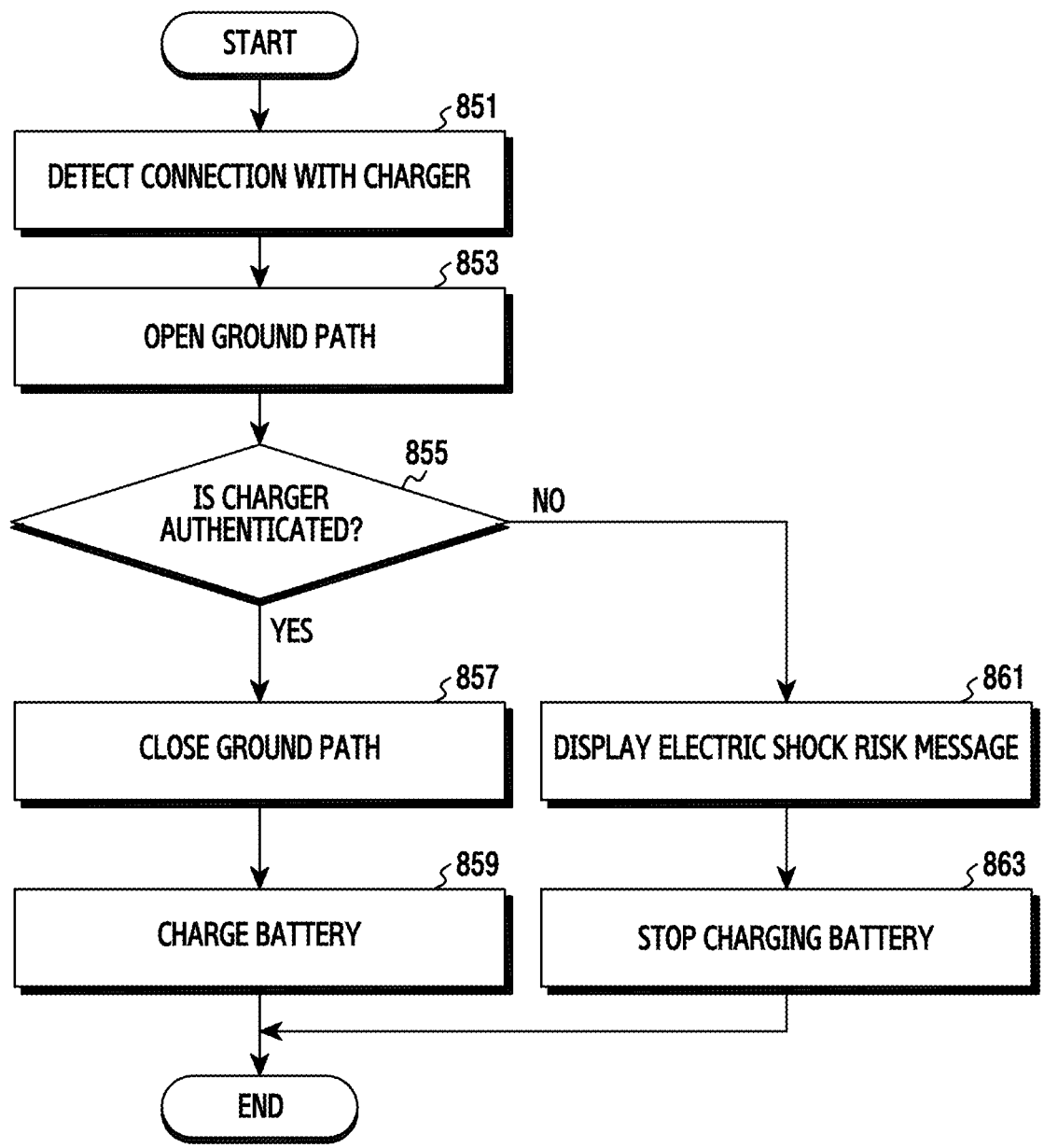

FIGS. 8A and 8B are flowcharts showing a method for operating of an electronic device according to various embodiments of the present disclosure.

FIGS. 8A and 8B are flowcharts showing a method for controlling charging in an electronic device according to a first embodiment. FIGS. 8A and 8B illustrate operations performed in an electronic device in which an electric shock prevention circuit is not mounted as shown in FIG. 7B.

Referring to FIG. 8A, in operation 801, the electronic device 410 (for example, the processor 485) may detect a connection with a charger. The processor 485 may determine whether a charger is connected to the input and output interface (for example, the interface 270) of the electronic device 410. Since operation 801 is the same as or similar to operation 505, a detailed description thereof is omitted.

In operation 803, the electronic device 410 (for example, the processor 485) may detect whether a leakage path is formed from board ground 481 to a metal member 451, 453, 455. The processor 485 may detect whether a leakage path from board ground 481 to a metal member 451, 453, 455 of the electronic device 410. The processor 485 may detect whether a leakage path from board ground 481 to a metal member 451, 453, 455 of the electronic device 410 by using the abnormality detection circuit 483. The abnormality detection circuit 483 may detect whether a from board ground 481 to a metal member 451, 453, 455 is formed in real time or according to an instruction of the processor 485, and may transmit a result of detecting (for example, circuit abnormality information) to the processor 485. For example, when the charger is connected, the processor 485 may instruct the abnormality detection circuit 483 to detect whether a leakage current is received, and may receive the result of detecting from the abnormality detection circuit 483.

The processor 485 may perform operation 807 when it is detected that the leakage path from board ground 481 to a metal member 451, 453, 455 is formed, and may perform operation 805 when it is detected that the leakage path from board ground 481 to a metal member 451, 453, 455 is not formed.

When the leakage path from board ground 481 to a metal member 451, 453, 455 is not formed, the electronic device 410 (for example, the processor 485) may control charging of the electronic device 410 in operation 805. For example, when the leakage path from board ground 481 to a metal member 451, 453, 455 is not formed in the metal member of the electronic device 410, the processor 485 may charge a battery by receiving an electric current from the connected charger. That is, when the leakage path is not formed from board ground 481 to a metal member 451, 453, 455 of the electronic device 410, the processor 485 may charge the battery regardless of whether the charger is authenticated or not. However, when the connected charger is an unauthenticated charger, the processor 485 may display an electric shock risk message, and may charge the battery according to user's selection. According to an embodiment of the present disclosure, when the connected charger is an unauthenticated charger, the processor 485 may display the electric shock risk message and may stop charging the battery.

When the leakage path from board ground 481 to a metal member 451, 453, 455 is formed, the electronic device 410 (for example, the processor 485) may control charging based on whether the charger is authenticated or not in operation 807. For example, when the leakage path from board ground 481 to a metal member 451, 453, 455 is formed in the metal member of the electronic device 410, the processor 485 may determine whether the connected charger is an authenticated charger. The processor 485 may determine whether the charger is an authenticated charger based on identification information of the connected charger. When the leakage path from board ground 481 to a metal member 451, 453, 455 is formed, the processor 485 may allow only an authenticated charger to charge the battery. For example, when the connected charger is an authenticated charger (for example, when identification information of the charger matches predetermined identification information), the processor 485 may allow charging of the battery. When the connected charger is an unauthenticated charger (for example, when the identification information of the charger does not match the predetermined identification information), the processor 485 may disallow charging of the battery. When charging of the battery is disallowed, the processor 485 may display an electric shock risk message and may stop charging the battery.

FIG. 8B is a view showing operations performed when the ground terminal of the input and output interface connected with the power supply device 430 is disconnectable.

Referring to FIG. 8B, in operation 851, the electronic device 410 (for example, the processor 485) may detect a connection with a charger. The processor 485 may determine whether a charger is connected to the input and output interface (for example, the interface 270) of the electronic device 410. Since operation 851 is the same as or similar to operation 505, a detailed description thereof is omitted.

In operation 853, the electronic device 410 (for example, the processor 485) may open a ground path. When the charger is connected, the processor 485 may open the ground path (for example, open a switch (for example, the switch 740, 791) and may control to disconnect the ground terminal (for example, the ground terminal 411) of the input and output interface to the board terminal (for example, the board GND 481) of the electronic device 410. That is, even when the charger is connected, the processor 485 may prevent charging until the charger is identified as being authenticated in order to guarantee safety of the user (for example, in order to reduce the risk of electric shock). For example, the processor 485 may switch (or change) the ground path to a closed state (a short circuit) or may maintain the ground path in the open state (open circuit) according to whether the connected charger is an authenticated charger.

In operation 855, the electronic device 410 (for example, the processor 485) may determine whether the connected charger is an authenticated charger. When the charger is connected, the processor 485 may receive charger identification information (for example, a charger number, a charger ID, etc.) from the charger, and may determine that the charger is an authenticated charger when the received identification information matches predetermined identification information. When the received identification information does not match the predetermined identification information, the processor 485 may determine that the charger is an unauthenticated charger.

When the connected charger is the authenticated charger, the processor 485 may perform operation 857, and, when the connected charger is not the authenticated charger, the processor 485 may perform operation 861.

When the charger is the authenticated charger, the electronic device 410 (for example, the processor 485) may close/connect the ground path in operation 857. The processor 485 may control the ground path to be changed from the open/disconnected state to the close/connected state (for example, short the switch (for example, the switch 740, 791). That is, the processor 485 may close/connect the ground path to connect the ground terminal (for example, the ground terminal 411) of the input and output interface to the board terminal (for example, the board GND 481) of the electronic device 410.

In operation 859, the electronic device 410 (for example, the processor 485) may charge the battery of the electronic device 410. For example, the processor 485 may charge the battery by receiving an electric current from the connected charger. That is, when the charger is the authenticated charger, the processor 485 may switch the ground path from the open/disconnected state to the close/connected state, and may charge the battery. For example, when a leakage path from board ground 481 to a metal member 451, 453, 455 is not detected and an authenticated charger is connected, the processor 485 may charge the battery.

When the charger is not the authenticated charger, the electronic device 410 (for example, the processor 485) may display an electric shock risk message in operation 861. The electric shock risk message may include at least one of a text, an image or a video informing that there is a risk of electric shock when an unauthenticated charger is connected. Since operation 861 is similar to or the same as operation 607, a detailed description thereof is omitted.

In operation 863, the electronic device 410 (for example, the processor 485) may stop charging the battery. Stopping charging the battery may refer to maintaining the ground path in the open/disconnected state. For example, the processor 485 may maintain the ground path in operation 853 in the open/disconnected state. When the ground terminal (for example, the ground terminal 411) of the input and output interface is not connected to the board terminal (for example, the board GND 481) of the electronic device 410 (for example, the ground path is opened), the battery may not be charged even if the charger is connected to the electronic device 410. For example, when a leakage path is detected and an unauthenticated charger is connected, the processor 485 may stop charging the battery.

Figure 9:
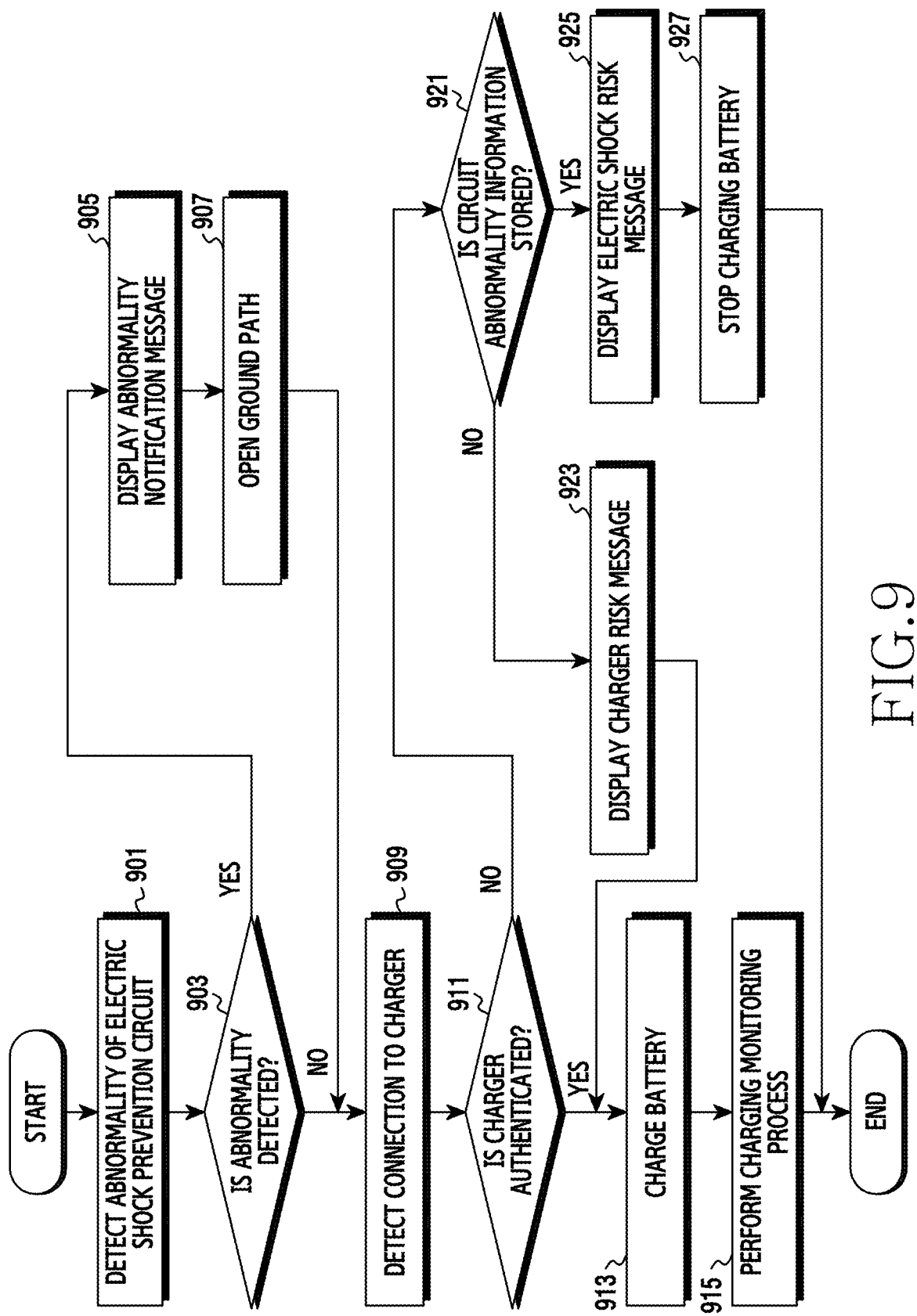
FIG. 9 and FIG. 10 are flowcharts showing a method for operating of an electronic device according to various embodiments.
Figure 10:
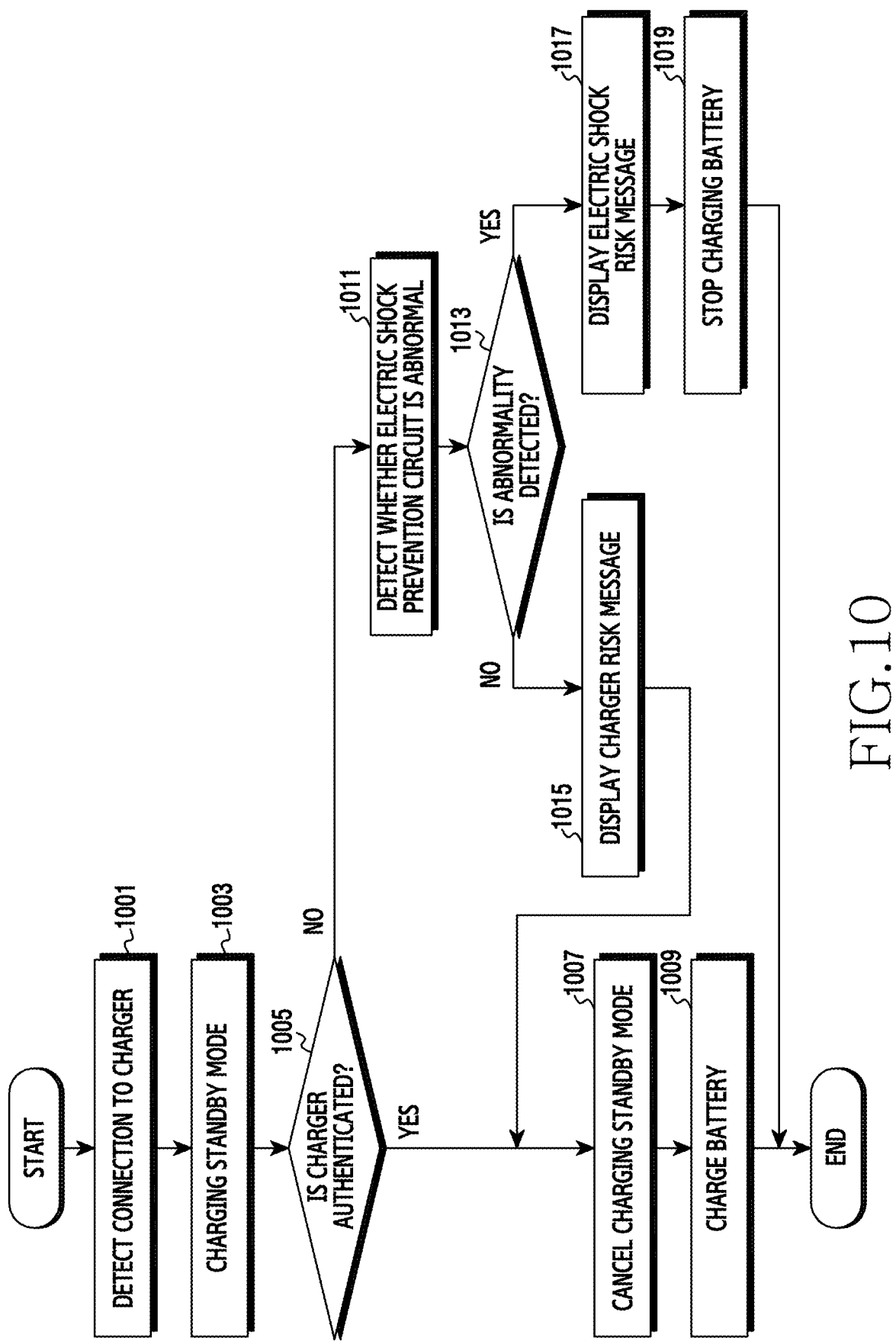

FIGS. 9 and 10 are flowcharts showing a method for operating of an electronic device according to various embodiments.

FIG. 9 is a flowchart showing a method for controlling charging in an electronic device according to a second embodiment.

Referring to FIG. 9, in operation 901, the electronic device 410 (for example, the processor 485) may detect whether an electric shock prevention circuit is abnormal. The processor 485 may determine whether the electric shock prevention circuit (for example, the electric shock prevention circuits 471, 473, 475) is abnormal by using an abnormality detection circuit (for example, the abnormality detection circuit 483). For example, the abnormality detection circuit 483 may detect whether the electric shock prevention circuit is abnormal (or is damaged) or whether a leakage path is formed from board ground 481 to a metal member 451, 453, 455, and may transmit the result of detecting (for example, circuit abnormality information) to the processor 485. Since operation 901 is the same as or similar to operation 501, a detailed description thereof is omitted.

In operation 903, the electronic device 410 (for example, the processor 485) may determine whether an abnormality is detected. The processor 485 may receive circuit abnormality information from the abnormality detection circuit 483, and may determine whether the electric shock prevention circuit is abnormal or whether a leakage path is formed from board ground 481 to a metal member 451, 453, 455. Since operation 903 is the same as or similar to operation 503, a detailed description thereof is omitted.

When the abnormality is detected (for example, when the circuit abnormality information is detected), the processor 485 may perform operation 905, and, when the abnormality is not detected (for example, when the circuit abnormality information is not detected), the processor 485 may perform operation 909.

When the circuit abnormality information is detected, the electronic device 410 (for example, the processor 485) may display an abnormality notification message in operation 905. The abnormality notification message may include at least one of a text, an image, or a video for alerting the user to the risk of electric shock. Since operation 905 is the same as or similar to operation 509, a detailed description thereof is omitted.

In operation 907, the electronic device 410 (for example, the processor 485) may open/disconnect the ground path. When the circuit abnormality information is detected, the processor 485 may open/disconnect the ground path and may prevent connection of the ground terminal (for example, the ground terminal 411) of the input and output interface to the board terminal (for example, the board GND 481) of the electronic device 410. Only when an authenticated charger is connected, the processor 485 may close/connect the ground path and control to connect the ground terminal 411 to the board terminal 481. The processor 485 may store the circuit abnormality information in a memory (for example, the memory 230). The circuit abnormality information may include information regarding whether there is an abnormality in the electric shock prevention circuit or not or whether a leakage path from board ground 481 to a metal member 451, 453, 455 is formed or not. According to an embodiment of the present disclosure, the circuit abnormality information may include identification information of the electric shock prevention circuit in which the abnormality is detected. The processor 485 may perform operation 909 after performing operation 907.

When the abnormality is not detected, the electronic device 410 (for example, the processor 485) may detect a connection with a charger (for example, the power supply device 430) in operation 909. The processor 485 may determine whether a charger is connected to the input and output interface (for example, the interface 270) of the electronic device 410. The charger may refer to the power supply device 430 of FIG. 4A. Since operation 909 is the same as or similar to operation 505, a detailed description thereof is omitted.

In operation 911, the electronic device 410 (for example, the processor 485) may determine whether the connected charger (for example, the power supply device 430) is an authenticated charger. When the abnormality of the electric shock prevention circuit is detected or a leakage path is formed, the processor 485 may control charging based on whether the charger is authenticated or not.

The processor 485 may perform operation 913 when the connected charger (for example, the power supply device 430) is an authenticated charger, and may perform operation 921 when the connected charger (for example, the power supply device 430) is not the authenticated charger.

When the charger is the authenticated charger (for example, the power supply device 430), the electronic device 410 (for example, the processor 485) may charge the battery (for example, the battery 296) of the electronic device 410 in operation 913. For example, the processor 485 may charge the battery by connecting the ground terminal of the input and output interface to the board ground of the electronic device 410 (for example, by closing the ground terminal). Since operation 913 is the same as or similar to operation 507, a detailed description thereof is omitted.

In operation 915, the electronic device 410 (for example, the processor 485) may perform a charging monitoring process. The charging monitoring process may include an operation of controlling charging according to a shock occurring when the battery is being charged or a grip state of the user gripping the electronic device 410. The charging monitoring process will be described in detail below with reference to FIGS. 11 and 12.

When the connected charger (for example, the power supply device 430) is not the authenticated charger, the electronic device 410 (for example, the processor 485) may determine whether circuit abnormality information is stored in operation 921. For example, when the circuit abnormality information is not detected (for example, "No" in operation 903), or when the circuit abnormality information is detected (for example, "Yes" in operation 903), the processor 485 may detect a connection with a charger. However, when the circuit abnormality information is detected, but the charger is the authenticated charger, the processor 485 may allow charging. According to an embodiment of the present disclosure, when the circuit abnormality information is not detected, the processor 485 may allow even an unauthenticated charger to charge.

The processor 485 may perform operation 925 when the circuit abnormality information is stored in the memory 230, and may perform operation 923 when the circuit abnormality information is not stored in the memory 230.

When the circuit abnormality information is not stored, the electronic device 410 (for example, the processor 485) may display a charger risk message in operation 923. For example, when the circuit abnormality information is not detected, the processor 485 may allow an unauthenticated charger to charge. However, even when charging is allowed, there is a need for informing of the risk of the charger. The charger risk message may include at least one of a text, an image, or a video informing that there is a high risk of electric shock because the charger is not authenticated. For example, the charger risk message may include a text "The charger is not authenticated. There is a risk of electric shock. Please visit the nearest repair shop." The processor 485 may charge the battery of the electronic device 410 by performing operations 913 and 915 after performing operation 923.

When the circuit abnormality information is stored, the electronic device 410 (for example, the processor 485) may display an electric shock risk massage in operation 925. The electric shock risk message may include at least one of a text, an image, or a video informing that there is a risk of electric shock when an unauthenticated charger is connected. For example, the electric shock risk message may include a text "There is a risk of electric shock. Please remove the charger from the electronic device. Please do not grip a metal portion with your hand when removing the charger. Please visit the nearest repair shop."

In operation 927, the electronic device 410 (for example, the processor 485) may stop charging the battery (for example, the battery 296). When the abnormality is detected in the electric shock prevention circuit and the unauthenticated charger is connected, the processor 485 may control not to charge the battery. For example, the processor 485 may maintain the ground path in the open state when performing operation 927 after performing operation 923. When the ground path is opened, the battery may not be charged even if the charger is connected to the electronic device 410. Although FIG. 9 depicts that operation 927 is performed after operation 925, operation 927 may be performed first and then operation 925 may be performed, or operations 925 and 927 may be performed simultaneously.

FIG. 10 is a flowchart showing a method for controlling charging in an electronic device according to a third embodiment.

Referring to FIG. 10, in operation 1001, the electronic device 410 (for example, the processor 485) may detect a connection with a charger (for example, the power supply device 430). The processor 485 may determine whether a charger is connected to the input and output interface (for example, the interface 270) of the electronic device 410. Since operation 1001 is the same as or similar to operation 505, a detailed description thereof is omitted.

In operation 1003, the electronic device 410 (for example, the processor 485) may operate in a charger standby mode. The charging standby mode refers to a state in which the ground terminal of the input and output interface (for example, the interface 270) of the electronic device 410 is opened/disconnected so as not to be connected to the board ground of the electronic device 410 (for example, the switch 740, 791 is turned off). Operation 1003 may be performed when the ground terminal of the input and output interface is disconnectable from the board ground. That is, the processor 485 may prevent charging until the charger is identified as being authenticated even when the charger is connected, in order to guarantee user's safety (for example, in order to reduce the risk of electric shock).

In operation 1005, the electronic device 410 (for example, the processor 485) may determine whether the connected charger (for example, the power supply device 430) is an authenticated charger or not. The processor 485 may allow only the authenticated charger to charge regardless of whether there is an abnormality in the electric shock prevention circuit or whether a leakage path from board ground 481 to a metal member 451, 453, 455 is formed.

The processor 485 may perform operation 1007 when the connected charger (for example, the power supply device 430) is an authenticated charger, and may perform operation 1011 when the connected charger (for example, the power supply device 430) is not the authenticated charger.

When the charger is the authenticated charger (for example, the power supply device 430), the electronic device 410 (for example, the processor 485) may cancel the charging standby mode in operation 1007. The processor 485 may cancel the charging standby mode by connecting the ground terminal of the input and output interface to the board ground of the electronic device 410 (for example, by switching the ground path from the open/disconnected state (for example, a state in which the switch (for example, the switch 740, 791) is turned off or opened) to the closed/connected state (for example, a state in which the switch (for example, the switch 740, 791) is turned on or forms a short circuit).

In operation 1009, the electronic device 410 (for example, the processor 485) may charge the battery (for example, the battery 296) of the electronic device 410. The processor 485 may perform a charging monitoring process while charging the battery.

When the charger is not the authenticated charger, the electronic device 410 (for example, the processor 485) may detect whether there is an abnormality in the electric shock prevention circuit (for example, the electric shock prevention circuits 471, 473, 475) in operation 1011. For example, at the time when it is determined that the connected charger is not the authenticated charger after the charger is connected, the processor 485 may detect whether there is an abnormality in the electric shock prevention circuit. This is because the authenticated charger has a low risk of electric shock regardless of whether there is an abnormality in the electric shock prevention circuit or a leakage path is formed. Accordingly, the processor 485 may command (or instruct) the abnormality detection circuit (for example, the abnormality detection circuit 483) to detect an abnormality only when the connected charger is not the authenticated charger. Since operation 1011 is the same as or similar to operation 501, a detailed description thereof is omitted.

In operation 1013, the electronic device 410 (for example, the processor 485) may determine whether the abnormality is detected. The processor 485 may receive circuit abnormality information from the abnormality detection circuit 483, and may determine whether the electric shock prevention circuit is abnormal or whether a leakage path is formed from board ground 481 to a metal member 451, 453, 455. Since operation 1013 is the same as or similar to operation 503, a detailed description thereof is omitted.

The processor 485 may perform operation 1017 when the abnormality is detected (for example, when the circuit abnormality information is detected), and may perform operation 1015 when the abnormality is not detected (for example, when the circuit abnormality information is not detected).

When the abnormality is not detected, the electronic device 410 (for example, the processor 485) may display a charger risk message in operation 1015. For example, when the circuit abnormality information is not detected, the processor 485 may allow the unauthenticated charger to charge. However, there is a need for informing of the risk of the charger although charging is allowed. The charger risk message may include at least one of a text, an image, or a video informing that there is a high risk of electric shock because the charger is not authenticated. The processor 485 may charge the battery of the electronic device 410 by performing operations 1007 and 1009 after performing operation 1015.

When the abnormality is detected, the electronic device 410 (for example, the processor 485) may display an electric shock risk message in operation 1017. The electric shock risk message may include at least one of a text, an image, or a video informing that there is the risk of electric shock if the unauthenticated charger is connected. For example, the electric shock risk message may include a text "There is a risk of electric shock. Please remove the charger from the electronic device. Please do not grip a metal portion with your hand when removing. Please visit the nearest repair shop."

In operation 1019, the electronic device 410 (for example, the processor 485) may stop charging the battery. The processor 485 may control not to charge the battery when the abnormality is detected in the electric shock prevention circuit and the unauthenticated charger is connected.

Figure 11:
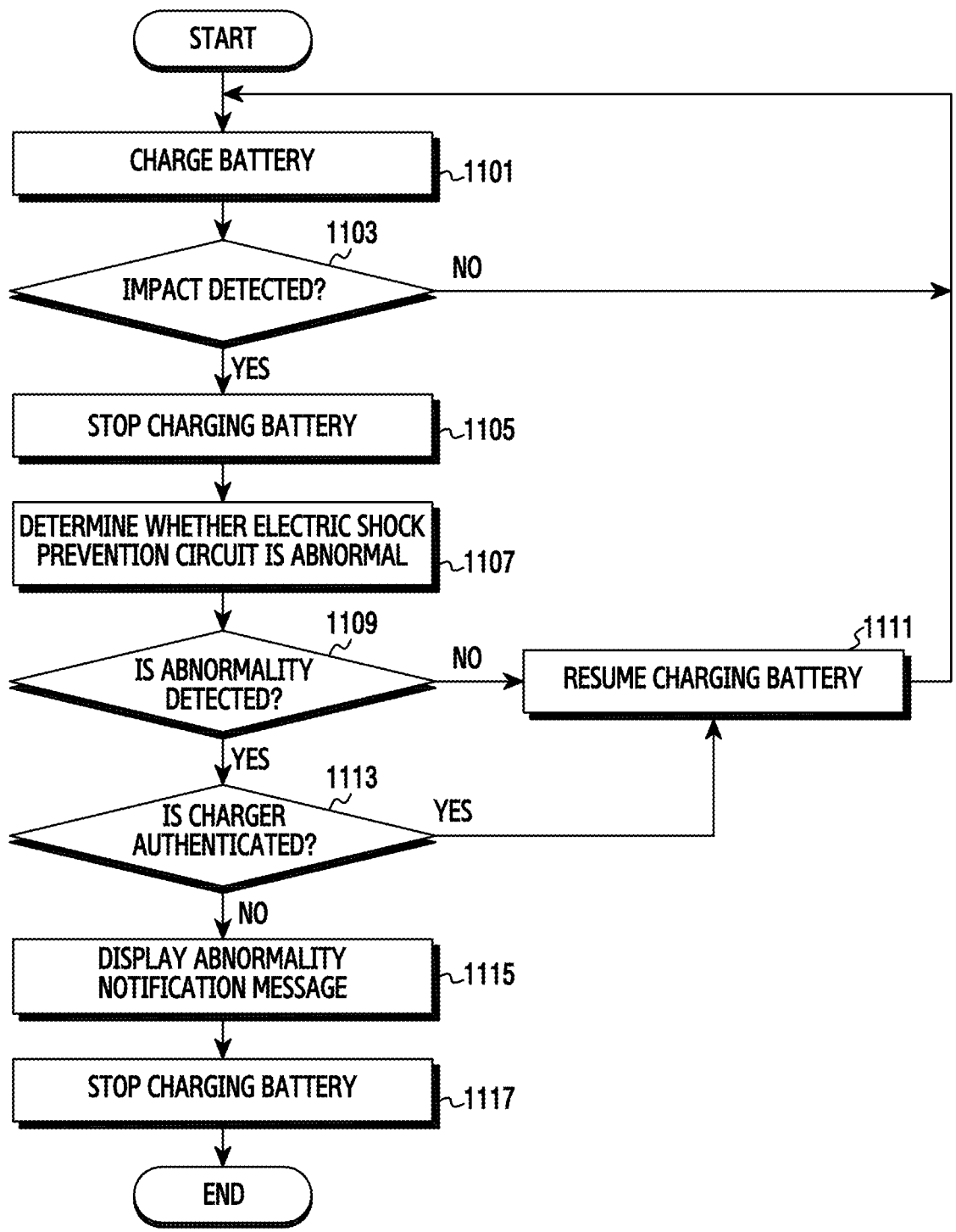
FIG. 11 and FIG. 12 are flowcharts showing a method for monitoring charging of an electronic device according to various embodiments.
Figure 12:
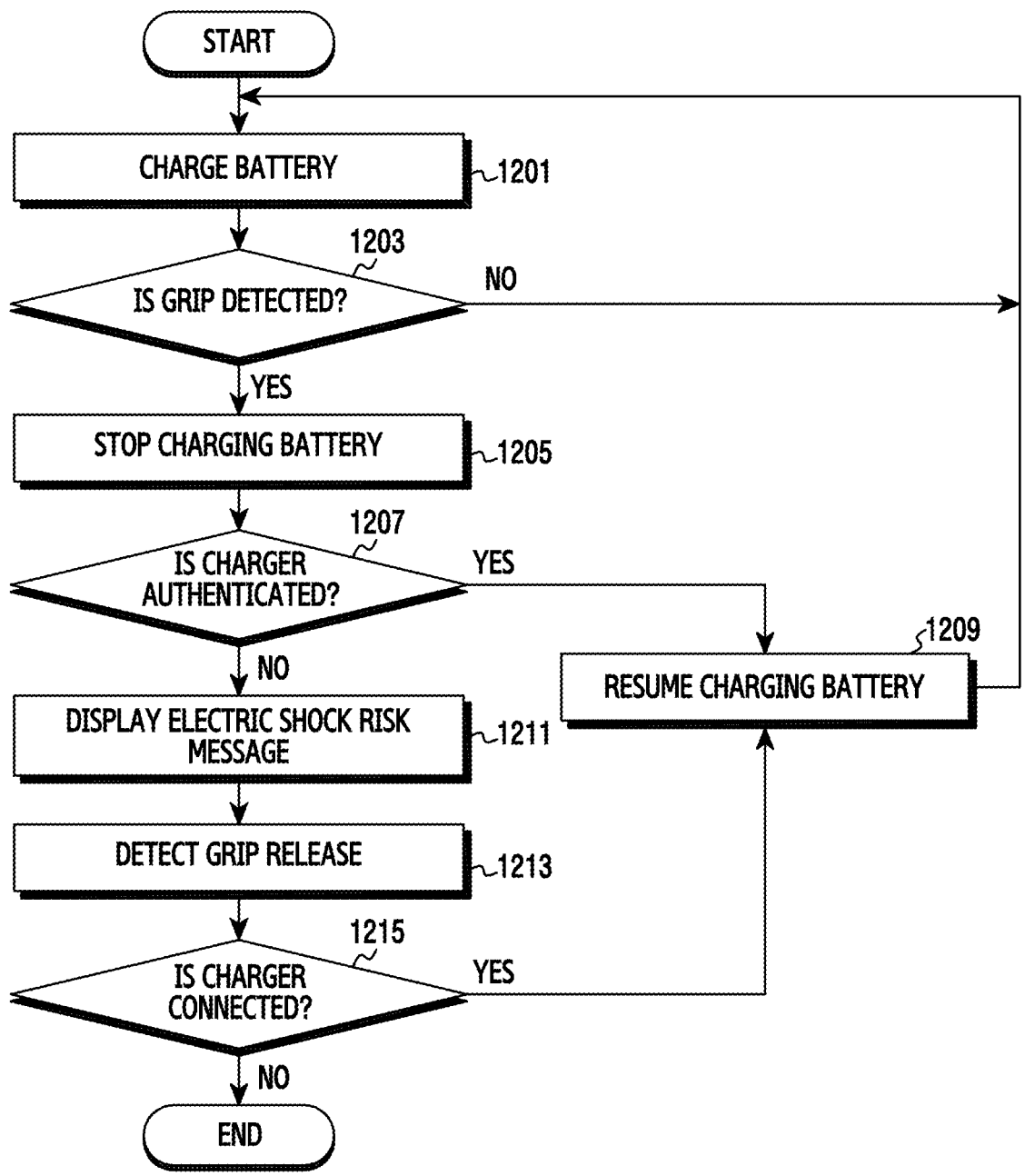

FIGS. 11 and 12 are flowcharts showing a method for monitoring charging of an electronic device according to various embodiments.

FIG. 11 is a flowchart showing a method for controlling charging based on an impact force to the electronic device.

Referring to FIG. 11, in operation 1101, the electronic device 410 (for example, the processor 485) may maintain a battery charging state. For example, operation 1101 may refer to an operation of charging the battery of the electronic device 410. Operation 1101 may include operation 507 of FIG. 5, operation 607 of FIG. 6, operation 913 of FIG. 9, and operation 1009 of FIG. 10.

In operation 1103, the electronic device 410 (for example, the processor 485) may determine whether an impact to the electronic device 410 is detected. For example, the electronic device 410 may fall off of a table with a charger being connected to the electronic device 410. An electric shock prevention circuit mounted in the electronic device 410 may be damaged due to the impact on the electronic device 410. According to an embodiment of the present disclosure, a leakage path from board ground 481 to a metal member 451, 453, 455 may be formed due to the shock to the electronic device 410. When the electric shock prevention circuit is damaged or the leakage path from board ground 481 to a metal member 451, 453, 455 is formed, there is a risk of electric shock. However, an authenticated charger may have a lower risk of electric shock than an unauthenticated charger.

According to various embodiments, when a force of impact greater than or equal to a reference value (for example, a impact reference value) is detected in the electronic device 410, the processor 485 may determine that the impact is detected, and, when an impact less than the reference value is detected in the electronic device 410, the processor 485 may determine that the impact is not detected. For example, the impact reference value may be set based on a value obtained when an impact enough to damage the electric shock prevention circuit is exerted. Accordingly, a different impact reference value may be set according to a circuit design of the electric shock prevention circuit.

The processor 485 may perform operation 1105 when the impact is detected in consideration of the above, and may return to operation 1101 when the impact is not detected. Accordingly, the processor 485 may continuously detect whether there is a shock to the electronic device 410 while charging the battery.

In operation 1105, the electronic device 410 (for example, the processor 485) may stop charging the battery (for example, the battery 296). Since the impact greater than or equal to the reference impact value is detected, the processor 485 may stop charging until it is detected whether there is an abnormality in the electric shock prevention circuit for the safety of the user. For example, the processor 485 may switch the ground terminal (for example, the ground terminal 411) of the input and output interface (for example, the interface 270) of the electronic device 410 from the close state to the open state. For example, when the battery is being charged, the ground terminal 411 is connected to the board ground (for example, the board ground 481) of the electronic device 410 (for example, the close state), and, when charging is stopped, the ground terminal 411 is not connected to the board ground 481 of the electronic device 410 (for example, the open state).

In operation 1107, the electronic device 410 (for example, the processor 485) may detect whether there is an abnormality in the electric shock prevention circuit. The processor 485 may detect whether there is an abnormality in the electric shock prevention circuit (for example, the electric shock prevention circuits 471, 473, 475) by using the abnormality detection circuit 483. For example, the abnormality detection circuit 483 may detect whether the electric shock prevention circuit is abnormal (or is damaged) or whether a leakage path is formed from board ground 481 to a metal member 451, 453, 455, and may transmit the result of detecting (for example, circuit abnormality information) to the processor 485. Since operation 1107 is the same as or similar to operation 501, a detailed description thereof is omitted.

In operation 1109, the electronic device 410 (for example, the processor 485) may determine whether the abnormality is detected or not. The processor 485 may receive the circuit abnormality information from the abnormality detection circuit 483, and may determine whether the electric shock prevention circuit is abnormal or whether the leakage path is formed in the metal member. Since operation 1109 is the same as or similar to operation 503, a detailed description thereof is omitted.

The processor 485 may perform operation 1113 when the abnormality is detected (for example, when the circuit abnormality information is detected), and may perform operation 1111 when the abnormality is not detected (for example, the circuit abnormality information is not detected).

When the abnormality is not detected, the electronic device 410 (for example, the processor 485) may resume charging the battery in operation 1111. The processor 485 may control to restart charging the battery which is stopped in operation 1105. For example, the processor 485 may switch the ground terminal of the input and output interface (for example, the interface 270) of the electronic device 410 from the open state to the close state. The processor 485 may return to operation 1101 after performing operation 1111.

When the circuit abnormality information is detected, the electronic device 410 (for example, the processor 485) may determine whether the charger which is charging (for example, the charger connected to the electronic device 410) is an authenticated charger in operation 1113. The processor 485 may control charging based on whether the charger is an authenticated charger.

The processor 485 may perform operation 1111 when the charger connected to the electronic device 410 is the authenticated charger, and may perform operation 1115 when the charger connected to the electronic device 410 is not the authenticated charger.

When the connected charger is not the authenticated charger, the electronic device 410 (for example, the processor 485) may display an abnormality notification message in operation 1115. The abnormality notification message may include at least one of a text, an image, or a video for alerting the user to the risk of electric shock. Since operation 1115 is the same as or similar to operation 509, a detailed description thereof is omitted.

In operation 1117, the electronic device 410 (for example, the processor 485) may stop charging the battery. For example, even when the charger is an unauthenticated charger, the processor 485 may allow charging the battery, but, when the circuit abnormality information is detected due to a shock while the battery is being charged, the processor 485 may stop charging the battery. According to an embodiment of the present disclosure, the state in operation 1105 may be maintained without performing operation 1117. For example, since the processor 485 switches the ground terminal of the input and output interface into the open/disconnected state in operation 1105, the open/disconnected state may be maintained even after operation 1115 is performed.

FIG. 12 is a flowchart showing a method for controlling charging according to a grip state of the electronic device.

Referring to FIG. 12, in operation 1201, the electronic device 410 (for example, the processor 485) may maintain a battery charging state. Since operation 1201 is the same as or similar to operation 1101, a detailed description thereof is omitted.

In operation 1203, the electronic device 410 (for example, the processor 485) may determine whether the electronic device 410 is gripped. For example, the user may grip the electronic device 410 being connected with a charger. The processor 485 may determine whether the user grips the electronic device 410 by using a sensor module (for example, the sensor module 240). For example, the processor 485 may determine whether the user grips the electronic device 410 by using a grip sensor (for example, the grip sensor 240F) included in the sensor module 240. Operation 1201 may refer to charging the battery by using an authenticated charger or an unauthenticated charger. However, the unauthenticated charger may increase the risk of electric shock in comparison to the authenticated charger.

The processor 485 may perform operation 1205 when the grip is detected in consideration of the above, and may return to operation 1201 when the grip is not detected. Accordingly, the processor 485 may continuously detect whether the user grips the electronic device 410 while charging the battery.

In operation 1205, the electronic device 410 (for example, the processor 485) may stop charging the battery (for example, the battery 296). The processor 485 may stop charging for the safety of the user when the user grips the electronic device 410 while the battery is being charged. For example, when the user grips the electronic device 410, the processor 485 may stop charging the battery regardless of whether there is an abnormality in the electric shock prevention circuit. Since operation 1205 is the same as or similar to operation 1105, a detailed description thereof is omitted.

In operation 1207, the electronic device 410 (for example, the processor 485) may determine whether the charger (for example, the power supply device 430) which is charging is an authenticated charger. The processor 485 may control charging based on whether the charger is an authenticated charger.

The processor 485 may perform operation 1209 when the charger (for example, the power supply device 430) connected to the electronic device 410 is the authenticated charger, and may perform operation 1211 when the charger (for example, the power supply device 430) connected to the electronic device 410 is not the authenticated charger.

When the charger (for example, the power supply device 430) connected to the electronic device 410 is the authenticated charger, the electronic device 410 (for example, the processor 485) may resume charging the battery (for example, the battery 296) in operation 1209. The processor 485 may control to restart charging the battery which is stopped in operation 1205. Since operation 1209 is the same as or similar to operation 1111, a detailed description thereof is omitted. The processor 485 may return to operation 1201 after performing operation 1209.

When the charger (for example, the power supply device 430) connected to the electronic device 410 is not the authenticated charger, the electronic device 410 (for example, the processor 485) may display an electric shock risk message in operation 1211. The electric shock risk message may include at least one of a text, an image, or a video for alerting the user to the risk of electric shock. Since operation 1211 is the same as or similar to operation 925, a detailed description thereof is omitted.

In operation 1213, the electronic device 410 (for example, the processor 485) may detect a grip release. For example, the processor 485 may stop charging the battery when the user grips the electronic device 410 with the charger (for example, the power supply device 430) being connected to the electronic device 410. When the user does not grip the electronic device 410, the processor 485 may resume charging the battery. To achieve this, the processor 485 may detect whether the user lays the electronic device 410 down on a floor. For example, the processor 485 may determine whether the user lays the electronic device 410 down on the floor without gripping by using the sensor module (for example, the sensor module 240). The processor 485 may detect a grip release by using a gyro sensor (for example, the gyro sensor 240B) included in the sensor module 240.

In operation 1215, the electronic device 410 (for example, the processor 485) may determine whether the charger (for example, the power supply device 430) is connected. For example, the user may remove the charger connected to the electronic device 410 to grip the electronic device 410. When the grip release is detected, the processor 485 may determine whether the charger is connected to the electronic device 410.

The processor 485 may perform operation 1209 when the charger (for example, the power supply device 430) is connected, and may finish the operation when the charger (for example, the power supply device 430) is not connected. For example, when the grip release is detected and the charger is connected to the electronic device 410, the risk of electric shock may be reduced and thus the processor 485 may resume charging the battery. When the grip release is detected and the charger is not connected to the electronic device 410, the processor 485 may maintain the state in operation 1205 without charging the battery. That is, since the processor 485 switches the ground terminal of the input and output interface to the open state in operation 1205, the processor 485 may maintain the open state even after performing operation 1215.

According to various embodiments. a method for operating of an electronic device which is formed of a metal member includes: detecting whether there is an abnormality in an electric shock prevention circuit mounted in the electronic device or whether a leakage path is formed in the metal member by using an abnormality detection circuit; and controlling charging a battery of the electronic device according to whether there is the abnormality in the electric shock prevention circuit or whether the leakage path is formed.

The method may further include displaying an abnormality notification message on a display when the abnormality is detected in the electric shock prevention circuit or it is detected that the leakage path is formed.

The detecting may include: detecting whether a power supply device is connected to an input and output interface of the electronic device; and detecting whether there is the abnormality in the electric shock prevention circuit or whether the leakage path is formed at a time when the power supply device is connected.

The controlling may include: determining whether the power supply device is authenticated; and allowing the charging the battery when the power supply device is authenticated, and disallowing the charging the battery when the power supply device is not authenticated.

The controlling may include, when the abnormality of the electric shock prevention circuit is detected or it is detected that the leakage path is formed, allowing an authenticated power supply device to charge the battery and prohibiting an unauthenticated power supply device from charging the battery.

The prohibiting may include displaying a charger risk message when the unauthenticated power supply device is connected to the input and output interface.

A computer-readable recording medium according to various embodiments may include a program for executing the operations of: detecting whether there is an abnormality in an electric shock prevention circuit mounted in the electronic device or whether a leakage path is formed in the metal member by using an abnormality detection circuit; and controlling charging a battery of the electronic device according to whether there is the abnormality in the electric shock prevention circuit or whether the leakage path is formed.

The computer-readable recording medium may include a hard disk, a floppy disk, a magnetic medium (e.g., a magnetic tape), an optical medium (e.g., CD-ROM and a DVD, a magneto-optical medium (e.g., a floptical disk)), an internal memory. The instruction may include a code generated by a complier or a code executable by an interpreter. A module or a program module according to various embodiments may include at least one of the above elements, or a portion of the above elements may be omitted, or additional other elements may be further included. According to various embodiments, operations performed by the module, the program module, or another component may be carried out sequentially, in parallel, repeatedly, or heuristically, or one or more of the operations may be executed in a different order or omitted, or one or more other operations may be added.

While the disclosure has been shown and described with reference to certain preferred embodiments thereof, it will be understood by those skilled in the art that various changes in form and details may be made therein without departing from the spirit and scope of the disclosure as defined by the appended claims. Therefore, the scope of the disclosure is defined not by the detailed description of the disclosure but by the appended claims, and all differences within the scope will be construed as being included in the present disclosure.

What is claimed is:

1. An electronic device which is formed of a metal member, the electronic device comprising:
   a memory;
   an electric shock prevention circuit electrically connected between the metal member and a ground of the electronic device;
   an abnormality detection circuit connected to the electric shock prevention circuit; and
   a processor functionally connected with the memory and the abnormality detection circuit,
   wherein the processor is configured to:
   when an impact to the electronic device is detected while a battery of the electronic device is being charged, stop the charging of the battery of the electronic device and identify whether there is an abnormality in the electric shock prevention circuit, and
   control charging the battery of the electronic device according to whether there is the abnormality in the electric shock prevention circuit.

2. The electronic device of claim 1, further comprising a display,
   wherein the processor is configured to display a message on the display when the abnormality is detected in the electric shock prevention circuit.

3. The electronic device of claim 1, further comprising an input and output interface,
wherein the processor is configured to detect whether there is the abnormality in the electric shock prevention circuit at a time when a power supply device is connected to the input and output interface.

4. The electronic device of claim 3, wherein the processor is configured to control the charging the battery additionally based on whether the power supply device is authenticated.

5. The electronic device of claim 4, wherein the processor is configured to determine whether the power supply device is authenticated, to allow the charging the battery when the power supply device is authenticated, and to disallow the charging the battery when the power supply device is not authenticated.

6. The electronic device of claim 1, wherein the processor is configured to determine whether a power supply device connected to an input and output interface of the electronic device is authenticated when the abnormality of the electric shock prevention circuit is detected.

7. The electronic device of claim 6, wherein, when the abnormality of the electric shock prevention circuit, the processor is configured to allow an authenticated power supply device to charge the battery and not to allow an unauthenticated power supply device to charge the battery.

8. The electronic device of claim 7, wherein the processor is configured to display a charger risk message on a display of the electronic device when the unauthenticated power supply device is connected to the input and output interface.

9. The electronic device of claim 1, wherein, when neither the abnormality of the electric shock prevention circuit, and an unauthenticated power supply device is connected, the processor is configured to display an electric shock risk message, and to control the charging the battery according to a user's selection.

10. The electronic device of claim 1, wherein the processor is configured to detect whether there is a-impact to the electronic device while the battery is being charged, and to control the charging the battery based on whether there is a-impact to the electronic device.

11. The electronic device of claim 10, wherein the processor is configured to resume the charging the battery when the abnormality of the electric shock prevention circuit is not detected.

12. The electronic device of claim 10, wherein the processor is configured to display a message and to stop the charging the battery when the abnormality of the electric shock prevention circuit is detected.

13. The electronic device of claim 1, wherein the processor is configured to detect a grip state of the electronic device while the battery is being charged, when the electronic device is gripped, to stop the charging the battery and to determine whether a power supply device connected to an input and output interface of the electronic device is authenticated, and, when the power supply device is authenticated, to resume the charging the battery.

14. The electronic device of claim 13, wherein the processor is configured to display an electric shock risk message when the power supply device is not authenticated, and to resume the charging the battery or finish the charging the battery based on the grip state of the electronic device and whether the power supply device is connected.

15. A method for operating of an electronic device which is formed of a metal member, the method comprising:
when impact to the electronic device is detected while a battery of the electronic device is being charged:
stopping the charging of the battery of the electronic device, and
identifying whether there is an abnormality in an electric shock prevention circuit electrically connected between the metal member and a ground of the electronic device using an abnormality detection circuit; and
controlling charging the battery of the electronic device according to whether there is the abnormality in the electric shock prevention circuit.

16. The method of claim 15, further comprising displaying a message on a display when the abnormality is detected in the electric shock prevention circuit.

17. The method of claim 15, wherein the detecting comprises:
detecting whether a power supply device is connected to an input and output interface of the electronic device; and
detecting whether there is the abnormality in the electric shock prevention circuit at a time when the power supply device is connected.

18. The method of claim 17, wherein the controlling comprises:
determining whether the power supply device is authenticated; and
allowing the charging the battery when the power supply device is authenticated, and disallowing the charging the battery when the power supply device is not authenticated.

19. The method of claim 15, wherein the controlling comprises, when the abnormality of the electric shock prevention circuit is detected, allowing an authenticated power supply device to charge the battery and prohibiting an unauthenticated power supply device from charging the battery.

20. The method of claim 19, wherein the prohibiting comprises displaying a charger risk message when the unauthenticated power supply device is connected to an input and output interface.

* * * * *